United States Patent
Chauhan

(10) Patent No.: US 11,281,744 B2
(45) Date of Patent: Mar. 22, 2022

(54) SYSTEMS AND METHODS FOR IMPROVED REMOTE DISPLAY PROTOCOL FOR HTML APPLICATIONS

(71) Applicant: Citrix Systems, Inc., Fort Lauderdale, FL (US)

(72) Inventor: Abhishek Chauhan, Santa Clara, CA (US)

(73) Assignee: Citrix Systems, Inc, Fort Lauderdale, FL (US)

( * ) Notice: Subject to any disclaimer, the term of this patent is extended or adjusted under 35 U.S.C. 154(b) by 61 days.

(21) Appl. No.: 16/129,015

(22) Filed: Sep. 12, 2018

(65) Prior Publication Data
US 2020/0082024 A1  Mar. 12, 2020

(51) Int. Cl.
G06F 40/14 (2020.01)
G06F 16/958 (2019.01)
H04L 67/02 (2022.01)
H04L 67/01 (2022.01)

(52) U.S. Cl.
CPC ............ G06F 16/986 (2019.01); G06F 40/14 (2020.01); H04L 67/02 (2013.01); H04L 67/42 (2013.01)

(58) Field of Classification Search
CPC .............................. G06F 16/986; G06F 16/958
See application file for complete search history.

(56) References Cited

U.S. PATENT DOCUMENTS

| | | |
|---|---|---|
| 6,829,746 B1 | 12/2004 | Schwerdtfeger et al. |
| 2011/0173590 A1* | 7/2011 | Yanes ................. G06F 11/3664 717/125 |
| 2014/0047318 A1* | 2/2014 | Glazkov ............. G06F 17/2247 715/234 |
| 2014/0136954 A1* | 5/2014 | Ligman .................. G06F 40/14 715/234 |
| 2015/0248468 A1 | 9/2015 | Cheng |
| 2016/0057220 A1* | 2/2016 | Gibbs ....................... G06F 8/65 709/203 |
| 2016/0170953 A1* | 6/2016 | Maddali ................. G06F 40/18 715/234 |
| 2018/0012256 A1* | 1/2018 | Napchi ............. G06Q 30/0257 |
| 2018/0139180 A1* | 5/2018 | Napchi .................. G06F 16/80 |
| 2019/0171770 A1* | 6/2019 | Walker ............... G06F 17/2247 |

OTHER PUBLICATIONS

International Search Report and Written Opinion for International Appl. No. PCT/US2019/050582, dated Dec. 2, 2019.
International Preliminary Report on Patentability on PCT Appl. No. PCT/US2019/050582 dated Mar. 25, 2021.

* cited by examiner

Primary Examiner — Ariel Mercado
(74) Attorney, Agent, or Firm — Foley & Lardner LLP

(57) ABSTRACT

Embodiments described herein include systems and methods for encapsulating HTML. A remote browser executing on a server may be configured to provide a document object model (DOM) of HTML of a webpage rendered by the remote browser at the server. A transcoding agent executing in the remote browser may be configured to encapsulate the HTML. The transcoding agent may be configured to send the encapsulated HTML via a remote delivery session to a local browser for rendering. The local browser may execute on a client device and may maintain a DOM for the encapsulated HTML. The transcoding agent may be configured to receive events corresponding to the DOM maintained by the local browser. The remote browser may further be configured to cause the received events to execute on the DOM provided by the remote browser.

20 Claims, 12 Drawing Sheets

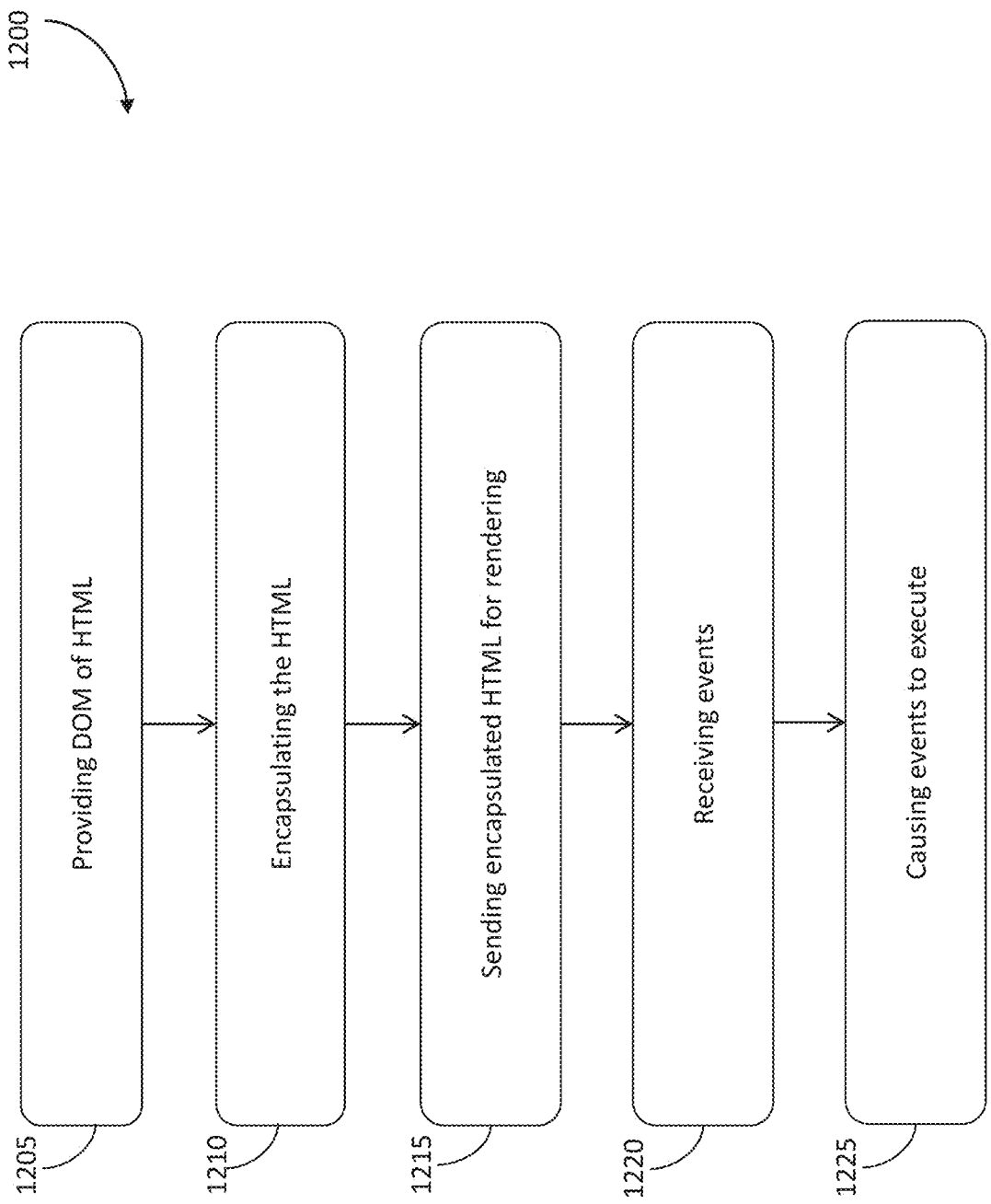

SYSTEMS AND METHODS FOR IMPROVED REMOTE DISPLAY PROTOCOL FOR HTML APPLICATIONS

FIELD OF THE DISCLOSURE

The present application generally relates to management of HTML applications, including but not limited to systems and methods for delivering HTML content to a client device.

BACKGROUND

As the workforce of an enterprise becomes more mobile and work under various conditions, an individual can use one or more client devices, including personal devices, to access network resources such as web applications. Such devices may be vulnerable or susceptible to malicious software or viruses when a user accesses such network or web applications or other webpages.

BRIEF SUMMARY

The present disclosure is directed towards systems and methods for encapsulating hypertext markup language (HTML). An agent (also referred to hereinafter as a transcoding agent) encapsulates HTML from a webpage (e.g., at a server). The encapsulated HTML is rendered by a local browser (e.g., at a client device). Such a processing pipeline is simple and efficient, both in terms of loading latency and overall resource consumption. Such a processing pipeline can bypass any remote rendering stages (e.g., at the server) and subsequent transcoding of pixels (e.g., at the client device). Rather, the local browser is utilized directly for rendering the encapsulated HTML.

In one aspect, this disclosure is directed to a method for encapsulating HTML. The method may include providing, by a remote browser hosted on a server, a document object model (DOM) of HTML of a webpage rendered by the remote browser at the server. The method may include encapsulating, by a transcoding agent executing in the remote browser, the HTML. The method may include sending, by the transcoding agent, the encapsulated HTML via a remote delivery session to a local browser for rendering. The local browser may execute on a client device and may maintain a DOM for the encapsulated HTML. The method may include receiving, by the transcoding agent, events corresponding to the DOM maintained by the local browser. The method may include causing, by the remote browser, the received events to execute on the DOM provided by the remote browser.

In some embodiments, the method may include encapsulating the HTML by transcoding the HTML using at least one web components application programming interface (API). The at least one web components API may include at least one of a shadow document object model or a custom element. In some embodiments, the remote browser includes an embedded browser or a secure browser that provides access to a web application, and the webpage is provided by the web application.

In some embodiments, the method further includes receiving, by the remote browser, the HTML of the webpage, and rendering, by the remote browser at the server, the received HTML. In some embodiments, the method further includes receiving, by the transcoding agent via the remote delivery session, the events corresponding to the DOM maintained by the local browser.

In some embodiments, the method further includes rendering, by the remote browser at the server, a portion of the HTML into an image comprising one or more pixels. In some embodiments, the method further includes sending, by the transcoding agent, the image via the remote delivery session to the local browser for display at the client device.

In some embodiments, the method further includes encapsulating the HTML to cause JAVASCRIPT or extensions in the DOM maintained for the encapsulated HTML to be blocked from reacting to the events. In some embodiments, the method further includes encapsulating the HTML to cause a call to browser services to be intercepted in the DOM maintained for the encapsulated HTML. In some embodiments, the method further includes causing the local browser to render at least a portion of the encapsulated HTML into pixels for display at the client device.

In another aspect, this disclosure is directed to a system for encapsulating HTML. The system may include a remote browser executing on a server. The remote browser may be configured to provide a document object model (DOM) of HTML of a webpage rendered by the remote browser at the server. The system may include a transcoding agent executing in the remote browser. The transcoding agent may be configured to encapsulate the HTML. The transcoding agent may be configured to send the encapsulated HTML via a remote delivery session to a local browser for rendering. The local browser may execute on a client device and may maintain a DOM for the encapsulated HTML. The transcoding agent may be configured to receive events corresponding to the DOM maintained by the local browser. The remote browser may be configured to cause the received events to execute on the DOM provided by the remote browser.

In some embodiments, the transcoding agent is configured to encapsulate the HTML by transcoding the HTML using at least one web components application programming interface (API). The at least one web components API may include at least one of a shadow document object model or a custom element. In some embodiments, the remote browser includes an embedded browser or a secure browser that provides access to a web application, and the webpage is provided by the web application.

In some embodiments, the remote browser is further configured to receive the HTML of the webpage, and to render the received HTML at the server. In some embodiments, the transcoding agent is configured to receive, via the remote delivery session, the events corresponding to the DOM maintained by the local browser.

In some embodiments, the remote browser is further configured to render, at the server, a portion of the HTML into an image comprising one or more pixels. In some embodiments, the transcoding agent is configured to send the image via the remote delivery session to the local browser for display at the client device.

In some embodiments, the transcoding agent is configured to encapsulate the HTML to cause JAVASCRIPT or extensions in the DOM maintained for the encapsulated HTML to be blocked from reacting to the events. In some embodiments, the transcoding agent is configured to encapsulate the HTML to cause a call to browser services to be intercepted in the DOM maintained for the encapsulated HTML. In some embodiments, the local browser renders at least a portion of the encapsulated HTML into pixels for display at the client device.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 6 is an example representation of an implementation for browser redirection using a secure browser plug-in;

FIG. 12 is a flow diagram of one example embodiment of a method for encapsulating HTML.

Figure 1:
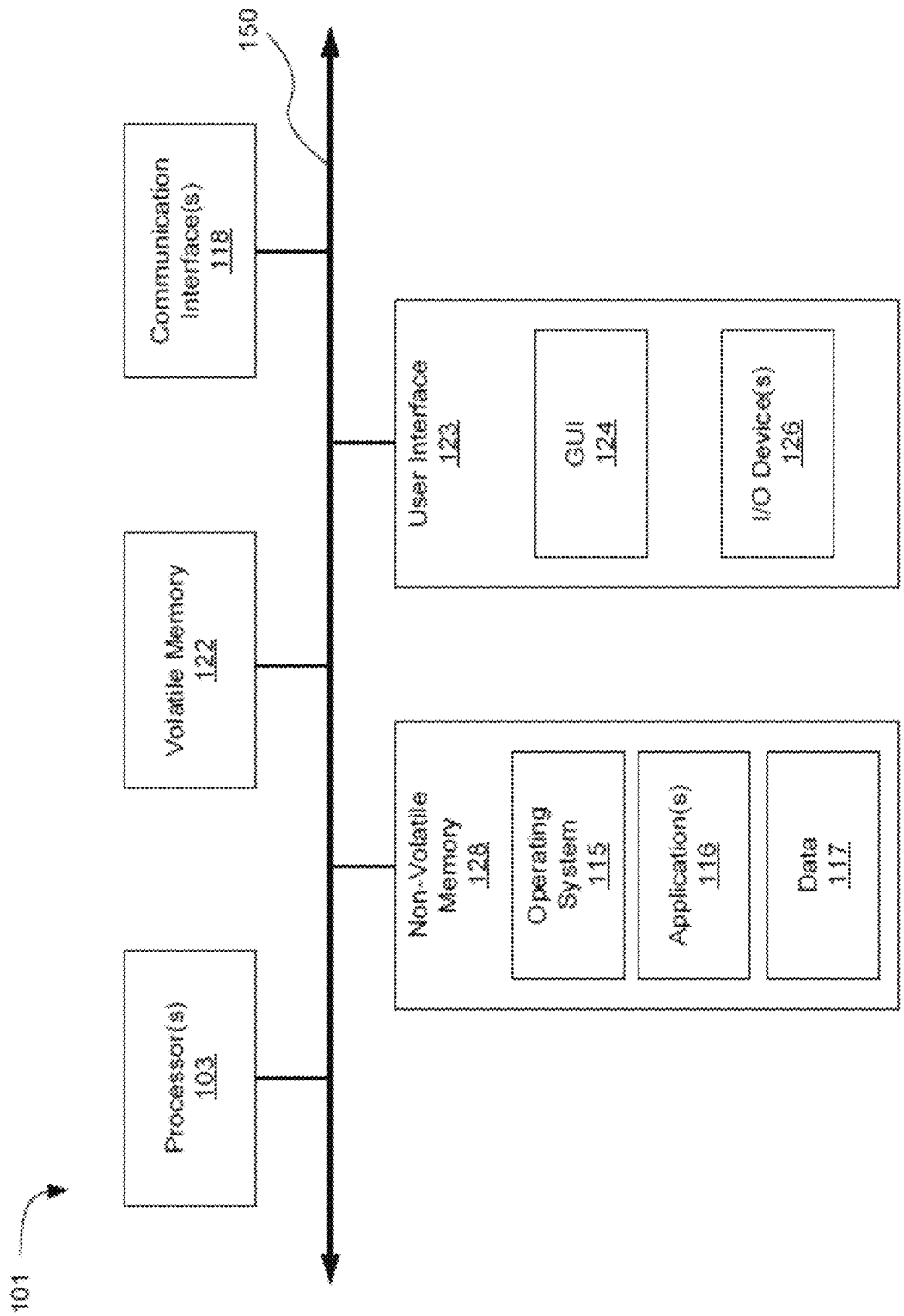
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for an embedded browser.

Section C describes systems and methods for encapsulating hypertext markup language (HTML)

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for an Embedded Browser

The present disclosure is directed towards systems and methods of an embedded browser. A client application executing on a client device can allow a user to access applications (apps) that are served from and/or hosted on one or more servers, such as web applications and software-as-a-service (SaaS) applications (hereafter sometimes generally referred to as network applications). A browser that is embedded or integrated with the client application can render to the user a network application that is accessed or requested via the client application, and can enable interactivity between the user and the network application. The browser is sometimes referred to as an embedded browser, and the client application with embedded browser (CEB) is sometimes referred to as a workspace application. The client application can establish a secure connection to the one or more servers to provide an application session for the user to access the network application using the client device and the embedded browser. The embedded browser can be integrated with the client application to ensure that traffic related to the network application is routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface.

The client application can terminate one end of a secured connection established with a server of a network application, such as a secure sockets layer (SSL) virtual private network (VPN) connection. The client application can receive encrypted traffic from the network application, and can decrypt the traffic before further processing (e.g., rendering by the embedded browser). The client application can monitor the received traffic (e.g., in encrypted packet form), and also have full visibility into the decrypted data stream and/or the SSL stack. This visibility can allow the client application to perform or facilitate policy-based management (e.g., including data loss prevention (DLP) capabilities), application control (e.g., to improve performance, service level), and collection and production of analytics. For instance, the local CEB can provide an information technology (IT) administrator with a controlled system for deploying web and SaaS applications through the CEB, and allow the IT administrator to set policies or configurations via the CEB for performing any of the forgoing activities.

Many web and SaaS delivered applications connect from web servers to generic browsers (e.g., INTERNET EXPLORER, FIREFOX, and so on) of users. Once authenticated, the entire session of such a network application is encrypted. However, in this scenario, an administrator may not have visibility, analytics, or control of the content entering the network application from the user's digital workspace, or the content leaving the network application and entering the user's digital workspace. Moreover, content of a network application viewed in a generic browser can be copied or downloaded (e.g., by a user or program) to potentially any arbitrary application or device, resulting in a possible breach in data security.

This present systems and methods can ensure that traffic associated with a network application is channeled through a CEB. By way of illustration, when a user accesses a SaaS web service with security assertion markup language (SAML) enabled for instance, the corresponding access request can be forwarded to a designated gateway service that determines, checks or verifies if the CEB was used to make the access request. Responsive to determining that a CEB was used to make the access request, the gateway service can perform or provide authentication and single-sign-on (SSO), and can allow the CEB to connect directly to the SaaS web service. Encryption (e.g., standard encryption) can be used for the application session between the CEB and the SaaS web service. When the content from the web service is unencrypted in the CEB to the viewed via the embedded browser, and/or when input is entered via the CEB, the CEB can provide added services on selective application-related information for control and analytics for instance. For example, an analytics agent or application programming interface (API) can be embedded in the CEB to provide or perform the added services.

The CEB (sometimes referred to as workspace application or receiver) can interoperate with one or more gateway services, intermediaries and/or network servers (sometimes collectively referred to as cloud services or Citrix Cloud) to provide access to a network application. Features and elements of an environment related to the operation of an embodiment of cloud services are described below.

Figure 2:
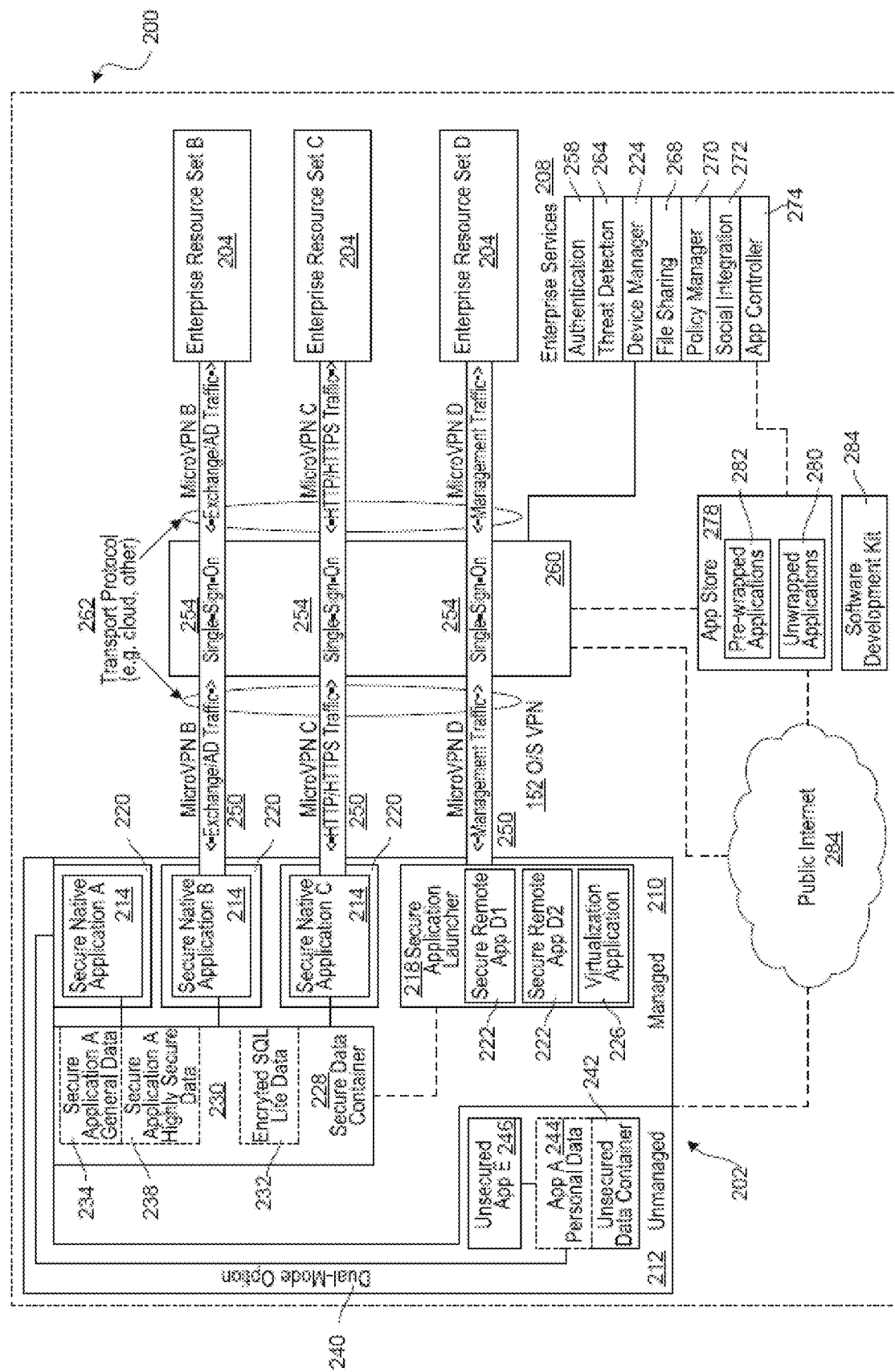
FIG. 2 is a block diagram of an illustrative embodiment of cloud services for use in accessing resources.

FIG. 2 illustrates an embodiment of cloud services for use in accessing resources including network applications. The cloud services can include an enterprise mobility technical architecture 200, which can include an access gateway 260 in one illustrative embodiment. The architecture can be used in a bring-your-own-device (BYOD) environment for instance. The architecture can enable a user of a client device 202 (e.g., a mobile or other device) to both access enterprise or personal resources from a client device 202, and use the client device 202 for personal use. The user may access such enterprise resources 204 or enterprise services 208 via a client application executing on the client device 202. The user may access such enterprise resources 204 or enterprise services 208 using a client device 202 that is purchased by the user or a client device 202 that is provided by the enterprise to user. The user may utilize the client device 202 for business use only or for business and personal use. The client device may run an iOS operating system, and ANDROID operating system, or the like. The enterprise may choose to implement policies to manage the client device 202. The policies may be implanted through a firewall or gateway in such a way that the client device may be identified, secured or security verified, and provided selective or full access to the enterprise resources. The policies may be client device management policies, mobile application management policies, mobile data management policies, or some combination of client device, application, and data management policies. A client device 202 that is managed through the application of client device management policies may be referred to as an enrolled device. The client device management policies can be applied via the client application for instance.

In some embodiments, the operating system of the client device may be separated into a managed partition 210 and an unmanaged partition 212. The managed partition 210 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the client device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is not accessible by unmanaged apps and devices.

The secure applications may be email applications, web browsing applications, software-as-a-service (SaaS) access applications, WINDOWS Application access applications, and the like. The client application can include a secure application launcher 218. The secure applications may be secure native applications 214, secure remote applications 222 executed by the secure application launcher 218, virtualization applications 226 executed by the secure application launcher 218, and the like. The secure native applications 214 may be wrapped by a secure application wrapper 220. The secure application wrapper 220 may include integrated policies that are executed on the client device 202 when the secure native application is executed on the device. The secure application wrapper 220 may include meta-data that points the secure native application 214 running on the client device 202 to the resources hosted at the enterprise that the secure native application 214 may require to complete the task requested upon execution of the secure native application 214. The secure remote applications 222 executed by a secure application launcher 218 may be executed within the secure application launcher application 218. The virtualization applications 226 executed by a secure application launcher 218 may utilize resources on the client device 202, at the enterprise resources 204, and the like. The resources used on the client device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application may use the user interaction data as an input to the application operating on the server. In this arrangement, an enterprise may elect to maintain the application on the server side as well as data, files, etc., associated with the application. While an enterprise may elect to "mobilize" some applications in accordance with the principles herein by securing them for deployment on the client device (e.g., via the client application), this arrangement may also be elected for certain applications. For example, while some applications may be secured for use on the client device, others might not be prepared or appropriate for deployment on the client device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the client device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the client device. The enterprise can use a client application, which can include a virtualization application, to allow access to applications that are deemed more properly operated on the server side. In an embodiment, the virtualization application may store some data, files, etc., on the mobile phone in one of the secure storage locations. An enterprise, for example, may elect to allow certain information to be stored on the phone while not permitting other information.

In connection with the virtualization application, as described herein, the client device may have a virtualization application that is designed to present GUIs and then record user interactions with the GUI. The virtualization application may communicate the user interactions to the server side to be used by the server side application as user interactions with the application. In response, the application on the server side may transmit back to the client device a new GUI. For example, the new GUI may be a static page, a dynamic page, an animation, or the like, thereby providing access to remotely located resources.

The secure applications may access data stored in a secure data container 228 in the managed partition 210 of the client device. The data secured in the secure data container may be accessed by the secure wrapped applications 214, applications executed by a secure application launcher 222, virtualization applications 226 executed by a secure application launcher 218, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as Advanced Encryption Standard (AES) 128-bit encryption or the like, while highly secure data 238 may use a very strong form of encryption such as AES 256-bit encryption. Data stored in the secure data container 228 may be deleted from the device upon receipt of a command from the device manager 224. The secure applications may have a dual-mode option 240. The dual mode option 240 may present the user with an option to operate the secured application in an unsecured or unmanaged mode. In an unsecured or unmanaged mode, the secure applications may access data stored in an unsecured data container 242 on the unmanaged partition 212 of the client device 202. The data stored in an unsecured data container may be personal data 244. The data stored in an unsecured data container 242 may also be accessed by unsecured applications 248 that are running on the unmanaged partition 212 of the client device 202. The data stored in an unsecured data container 242 may remain on the client device 202 when the data stored in the secure data container 228 is deleted from the client device 202. An enterprise may want to delete from the client device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The client device 202 may connect to enterprise resources 204 and enterprise services 208 at an enterprise, to the public Internet 248, and the like. The client device may connect to enterprise resources 204 and enterprise services 208 through virtual private network connections. The virtual private network connections, also referred to as microVPN or application-specific VPN, may be specific to particular applications (e.g., as illustrated by microVPNs 250), particular devices, particular secured areas on the client device (e.g., as illustrated by O/S VPN 252), and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry MICROSOFT Exchange traffic, MICROSOFT Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the client device 202. The access gateway may also re-route traffic from the client device 202 to the public Internet 248, enabling the client device 202 to access publicly available and unsecured applications that run on the public Internet 248. The client device may connect to the access gateway via a transport network 262. The transport network 262 may use one or more transport protocols and may be a wired network, wireless network, cloud network, local area network, metropolitan area network, wide area network, public network, private network, and the like.

The enterprise resources 204 may include email servers, file sharing servers, SaaS/Web applications, Web application servers, WINDOWS application servers, and the like. Email servers may include Exchange servers, LOTUS NOTES servers, and the like. File sharing servers may include SHAREFILE servers, and the like. SaaS applications may include SALESFORCE, and the like. WINDOWS application servers may include any application server that is built to provide applications that are intended to run on a local WINDOWS operating system, and the like. The enterprise resources 204 may be premise-based resources, cloud based resources, and the like. The enterprise resources 204 may be accessed by the client device 202 directly or through the access gateway 260. The enterprise resources 204 may be accessed by the client device 202 via a transport network 262. The transport network 262 may be a wired network, wireless network, cloud network, local area network, metropolitan area network, wide area network, public network, private network, and the like.

Cloud services can include an access gateway 260 and/or enterprise services 208. The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services and the like. Authentication services 258 may use certificates. The certificates may be stored on the client device 202, by the enterprise resources 204, and the like. The certificates stored on the client device 202 may be stored in an encrypted location on the client device, the certificate may be temporarily stored on the client device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as FACEBOOK, TWITTER, and LINKEDIN, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the client device 202 through the access gateway 260, through the public Internet 248, or the like. The application store may be provided with an intuitive and easy to use User Interface.

A software development kit 284 may provide a user the capability to secure applications selected by the user by providing a secure wrapper around the application. An application that has been wrapped using the software development kit 284 may then be made available to the client device 202 by populating it in the application store 278 using the application controller 274.

The enterprise mobility technical architecture 200 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 3:
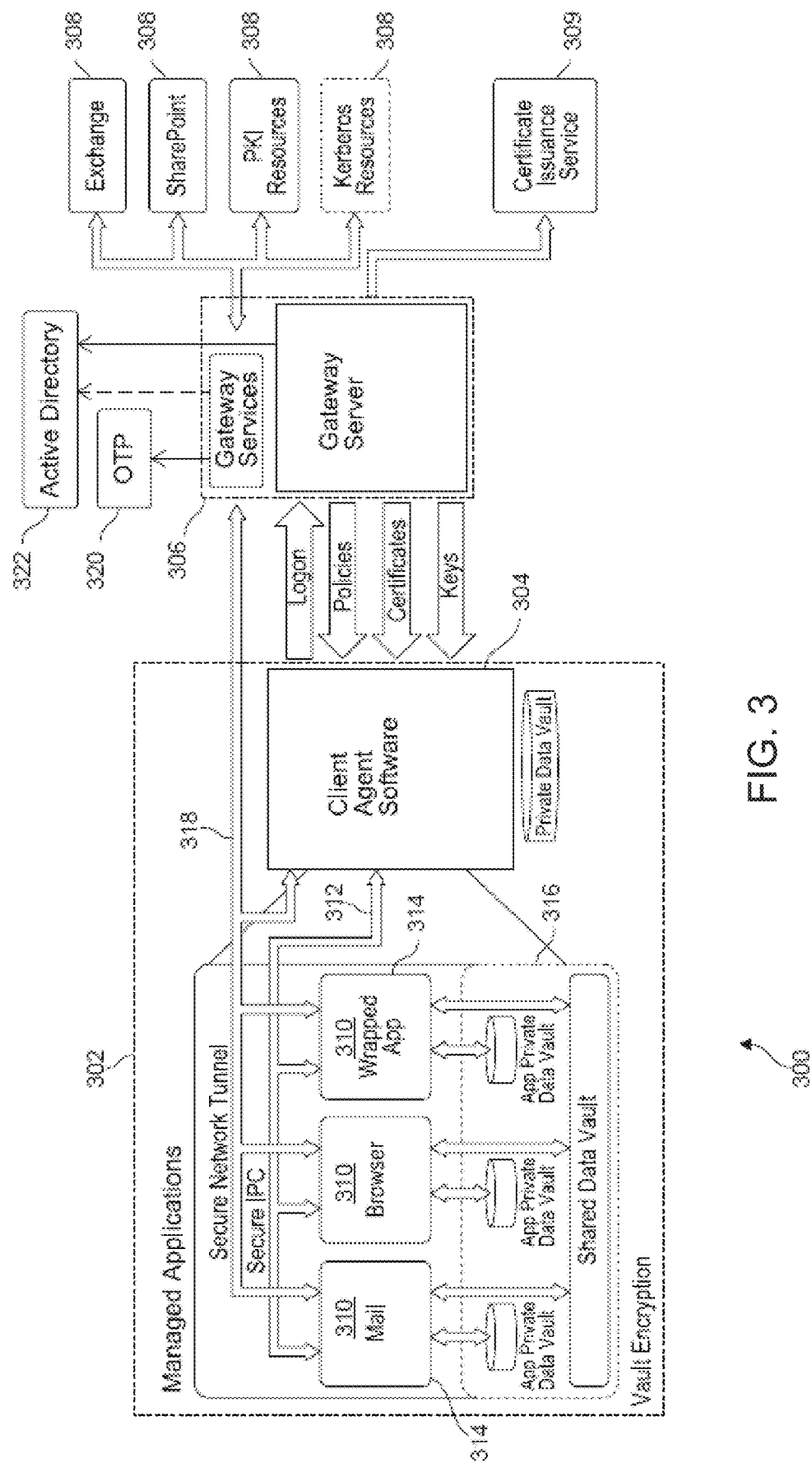
FIG. 3 is a block diagram of an example embodiment of an enterprise mobility management system.

FIG. 3 depicts is an illustrative embodiment of an enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and may include additional features not mentioned above.

In this case, the left hand side represents an enrolled client device 302 with a client agent 304, which interacts with gateway server 306 to access various enterprise resources 308 and services 309 such as Web or SasS applications, Exchange, SHAREPOINT, public-key infrastructure (PKI) Resources, Kerberos Resources, Certificate Issuance service, as shown on the right hand side above. The gateway server 306 can include embodiments of features and functionalities of the cloud services, such as access gateway 260 and application controller functionality. Although not specifically shown, the client agent 304 may be part of, and/or interact with the client application which can operate as an enterprise application store (storefront) for the selection and/or downloading of network applications.

The client agent 304 can act as a UI (user interface) intermediary for WINDOWS apps/desktops hosted in an Enterprise data center, which are accessed using the High-Definition User Experience (HDX) or Independent Computing Architecture (ICA) display remoting protocol. The client agent 304 can also support the installation and management of native applications on the client device 302, such as native iOS or ANDROID applications. For example, the managed applications 310 (mail, browser, wrapped application) shown in the figure above are native applications that execute locally on the device. Client agent 304 and application management framework of this architecture act to provide policy driven management capabilities and features such as connectivity and SSO (single sign on) to enterprise resources/services 308. The client agent 304 handles primary user authentication to the enterprise, for instance to access gateway (AG) with SSO to other gateway server components. The client agent 304 obtains policies from gateway server 306 to control the behavior of the managed applications 310 on the client device 302.

The Secure interprocess communication (IPC) links 312 between the native applications 310 and client agent 304 represent a management channel, which allows client agent to supply policies to be enforced by the application management framework 314 "wrapping" each application. The IPC channel 312 also allows client agent 304 to supply credential and authentication information that enables connectivity and SSO to enterprise resources 308. Finally the IPC channel 312 allows the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 requests policy information from client agent 304, which in turn requests it from gateway server 306. The application management framework 314 requests authentication, and client agent 304 logs into the gateway services part of gateway server 306 (also known as NetScaler access gateway). Client agent 304 may also call supporting services on gateway server 306, which may produce input material to derive encryption keys for the local data vaults 316, or provide client certificates which may enable direct authentication to PKI protected resources, as more fully explained below.

In more detail, the application management framework 314 "wraps" each managed application 310. This may be incorporated via an explicit build step, or via a post-build processing step. The application management framework 314 may "pair" with client agent 304 on first launch of an application 310 to initialize the Secure IPC channel and obtain the policy for that application. The application management framework 314 may enforce relevant portions of the policy that apply locally, such as the client agent login dependencies and some of the containment policies that restrict how local OS services may be used, or how they may interact with the application 310.

The application management framework 314 may use services provided by client agent 304 over the Secure IPC channel 312 to facilitate authentication and internal network access. Key management for the private and shared data vaults 316 (containers) may be also managed by appropriate interactions between the managed applications 310 and client agent 304. Vaults 316 may be available only after online authentication, or may be made available after offline authentication if allowed by policy. First use of vaults 316 may require online authentication, and offline access may be limited to at most the policy refresh period before online authentication is again required.

Network access to internal resources may occur directly from individual managed applications 310 through access gateway 306. The application management framework 314 is responsible for orchestrating the network access on behalf of each application 310. Client agent 304 may facilitate these network connections by providing suitable time limited secondary credentials obtained following online authentication. Multiple modes of network connection may be used, such as reverse web proxy connections and end-to-end VPN-style tunnels 318.

The Mail and Browser managed applications 310 can have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture can support the incorporation of various other security features. For example, gateway server 306 (including its gateway services) in some cases might not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 306 may identify managed native applications 310 that are allowed to have access to more sensitive data using strong authentication, and ensure that access to these applications is only permitted after performing appropriate authentication, even if this means a re-authentication is requested from the user after a prior weaker level of login.

Another security feature of this solution is the encryption of the data vaults 316 (containers) on the client device 302. The vaults 316 may be encrypted so that all on-device data including clipboard/cache data, files, databases, and configurations are protected. For on-line vaults, the keys may be stored on the server (gateway server 306), and for off-line vaults, a local copy of the keys may be protected by a user password or biometric validation. When data is stored locally on the device 302 in the secure container 316, it is preferred that a minimum of AES 256 encryption algorithm be utilized.

Other secure container features may also be implemented. For example, a logging feature may be included, wherein all security events happening inside an application 310 are logged and reported to the backend. Data wiping may be supported, such as if the application 310 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector might cause multiple copies of the same encrypted data to yield different cipher text output, preventing both replay and cryptanalytic attacks. This may also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented via the CEB, wherein after a policy-defined period of inactivity, a user session is terminated.

Data leakage from the application management framework 314 may be prevented in other ways. For example, when an application 310 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 320 without the use of an AD (active directory) 322 password for access to one or more applications. In some cases, some users do not know (or are not permitted to know) their AD password, so these users may authenticate using an OTP 320 such as by using a hardware OTP system like SecurID (OTPs may be provided by different vendors also, such as Entrust or Gemalto). In some cases, after a user authenticates with a user ID, a text is sent to the user with an OTP 320. In some cases, this may be implemented only for online use, with a prompt being a single field.

An offline password may be implemented for offline authentication for those applications 310 for which offline use is permitted via enterprise policy. For example, an enterprise may want storefront to be accessed in this manner. In this case, the client agent 304 may require the user to set a custom offline password and the AD password is not used. Gateway server 306 may provide policies to control and enforce password standards with respect to the minimum length, character class composition, and age of passwords, such as described by the standard WINDOWS Server password complexity requirements, although these requirements may be modified.

Another feature relates to the enablement of a client side certificate for certain applications 310 as secondary credentials (for the purpose of accessing PKI protected web resources via the application management framework micro VPN feature). For example, an application may utilize such a certificate. In this case, certificate-based authentication using ACTIVESYNC protocol may be supported, wherein a certificate from the client agent 304 may be retrieved by gateway server 306 and used in a keychain. Each managed application may have one associated client certificate, identified by a label that is defined in gateway server 306.

Gateway server 306 may interact with an Enterprise special purpose web service to support the issuance of client certificates to allow relevant managed applications to authenticate to internal PKI protected resources.

The client agent 304 and the application management framework 314 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing public-key cryptography standards (PKCS) 12 BLOB (Binary Large Object) into the iOS keychain in each managed application for each period of use. Application management framework client certificate support may use a HTTPS implementation with private in-memory key storage. The client certificate might never be present in the iOS keychain and might not be persisted except potentially in "online-only" data value that is strongly protected.

Mutual SSL or TLS may also be implemented to provide additional security by requiring that a client device 302 is authenticated to the enterprise, and vice versa. Virtual smart cards for authentication to gateway server 306 may also be implemented.

Both limited and full Kerberos support may be additional features. The full support feature relates to an ability to do full Kerberos login to Active Directory (AD) 322, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include remote wipe functionality even when an application 310 is not running.

A multi-site architecture or configuration of enterprise application store and an application controller may be supported that allows users to be service from one of several different locations in case of failure.

In some cases, managed applications 310 may be allowed to access a certificate and private key via an API (example OpenSSL). Trusted managed applications 310 of an enterprise may be allowed to perform specific Public Key operations with an application's client certificate and private key. Various use cases may be identified and treated accordingly, such as when an application behaves like a browser and no certificate access is used, when an application reads a certificate for "who am I," when an application uses the certificate to build a secure session token, and when an application uses private keys for digital signing of important data (e.g., transaction log) or for temporary data encryption.

Figure 4:
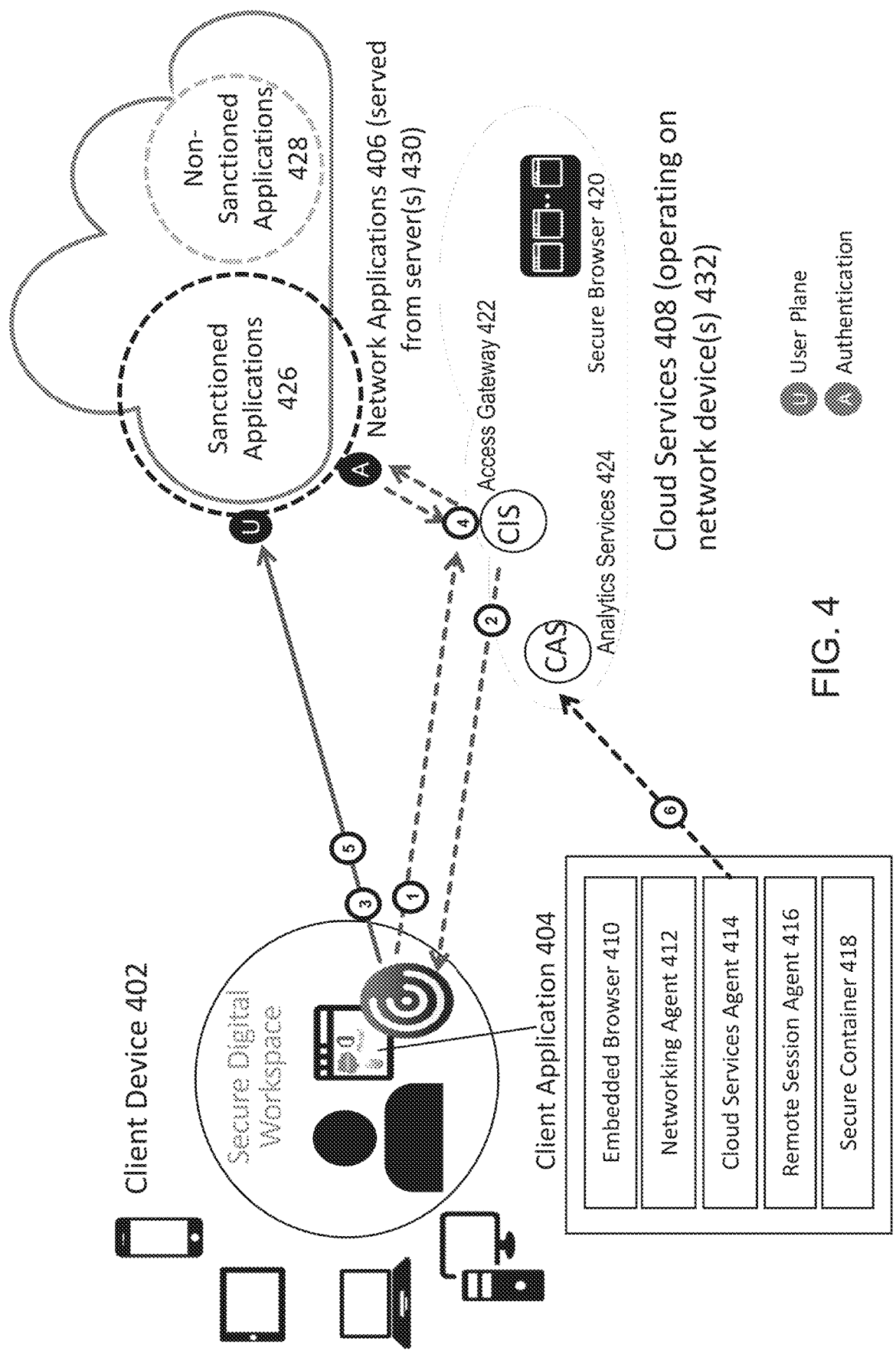
FIG. 4 is a block diagram of a system 400 of an embedded browser.

Referring now to FIG. 4, depicted is a block diagram of a system 400 of an embedded browser. In brief overview, the system 400 may include a client device 402 with a digital workspace for a user, a client application 404, cloud services 408 operating on at least one network device 432, and network applications 406 served from and/or hosted on one or more servers 430. The client application 404 can for instance include at least one of: an embedded browser 410, a networking agent 412, a cloud services agent 414, a remote session agent 416, or a secure container 418. The cloud services 408 can for instance include at least one of: secure browser(s) 420, an access gateway 422 (or CIS, e.g., for registering and/or authenticating the client application and/or user), or analytics services 424 (or CAS, e.g., for receiving information from the client application for analytics). The network applications 406 can include sanctioned applications 426 and non-sanctioned applications 428.

Each of the above-mentioned elements or entities is implemented in hardware, or a combination of hardware and software, in one or more embodiments. Each component of the system 400 may be implemented using hardware or a combination of hardware or software detailed above in connection with FIG. 1. For instance, each of these elements or entities can include any application, program, library, script, task, service, process or any type and form of executable instructions executing on hardware of the client device 402, the at least one network device 432 and/or the one or more servers 430. The hardware includes circuitry such as one or more processors in one or more embodiments. For example, the at least one network device 432 and/or the one or more servers 430 can include any of the elements of a computing device described above in connection with at least FIG. 1 for instance.

The client device 402 can include any embodiment of a computing device described above in connection with at least FIG. 1 for instance. The client device 402 can include any user device such as a desktop computer, a laptop computer, a tablet device, a smart phone, or any other mobile or personal device. The client device 402 can include a digital workspace of a user, which can include file system(s), cache or memory (e.g., including electronic clipboard(s)), container(s), application(s) and/or other resources on the client device 402. The digital workspace can include or extend to one or more networks accessible by the client device 402, such as an intranet and the Internet, including file system(s) and/or other resources accessible via the one or more networks. A portion of the digital workspace can be secured via the use of the client application 404 with embedded browser 410 (CEB) for instance. The secure portion of the digital workspace can include for instance file system(s), cache or memory (e.g., including electronic clipboard(s)), application(s), container(s) and/or other resources allocated to the CEB, and/or allocated by the CEB to network application(s) 406 accessed via the CEB. The secure portion of the digital workspace can also include resources specified by the CEB (via one or more policies) for inclusion in the secure portion of the digital workspace (e.g., a particular local application can be specified via a policy to be allowed to receive data obtained from a network application).

The client application 404 can include one or more components, such as an embedded browser 410, a networking agent 412, a cloud services agent 414 (sometimes referred to as management agent), a remote session agent 416 (sometimes referred to as HDX engine), and/or a secure container 418 (sometimes referred to as secure cache container). One or more of the components can be installed as part of a software build or release of the client application 404 or CEB, or separately acquired or downloaded and installed/integrated into an existing installation of the client application 404 or CEB for instance. For instance, the client device may download or otherwise receive the client application 404 (or any component) from the network device(s) 432. In some embodiments, the client device may send a request for the client application 404 to the network device(s) 432. For example, a user of the client device can initiate a request, download and/or installation of the client application. The network device(s) 432 in turn may send the client application to the client device. In some embodiments, the network device(s) 432 may send a setup or installation application for the client application to the client device. Upon receipt, the client device may install the client application onto a hard disk of the client device. In some embodiments, the client device may run the setup application to unpack or decompress a package of the client application. In some embodiments, the client application may be an extension (e.g., an add-on, an add-in, an applet or a plug-in) to another application (e.g., a networking agent 412) installed on the client device. The client device may install the client application to interface or inter-operate with the pre-installed application. In some embodiments, the client application may be a standalone application. The client device may install the client application to execute as a separate process.

The embedded browser 410 can include elements and functionalities of a web browser application or engine. The embedded browser 410 can locally render network application(s) as a component or extension of the client application. For instance, the embedded browser 410 can render a SaaS/Web application inside the CEB which can provide the CEB with full visibility and control of the application session. The embedded browser can be embedded or incorporated into the client application via any means, such as direct integration (e.g., programming language or script insertion) into the executable code of the client application, or via plugin installation. For example, the embedded browser can include a Chromium based browser engine or other type of browser engine, that can be embedded into the client application, using the Chromium embedded framework (CEF) for instance. The embedded browser can include a HTML5-based layout graphical user interface (GUI). The embedded browser can provide HTML rendering and JAVASCRIPT support to a client application incorporating various programming languages. For example, elements of the embedded browser can bind to a client application incorporating C, C++, DELPHI, Go, JAVA, .NET/Mono, VISUAL BASIC 6.0, and/or PYTHON.

In some embodiments, the embedded browser comprises a plug-in installed on the client application. For example, the plug-in can include one or more components. One such component can be an ActiveX control or JAVA control or any other type and/or form of executable instructions capable of loading into and executing in the client application. For example, the client application can load and run an Active X control of the embedded browser, such as in a memory space or context of the client application. In some embodiments, the embedded browser can be installed as an extension on the client application, and a user can choose to enable or disable the plugin or extension. The embedded browser (e.g., via the plugin or extension) can form or operate as a secured browser for securing, using and/or accessing resources within the secured portion of the digital workspace.

The embedded browser can incorporate code and functionalities beyond that available or possible in a standard or typical browser. For instance, the embedded browser can bind with or be assigned with a secured container 418, to define at least part of the secured portion of a user's digital workspace. The embedded browser can bind with or be assigned with a portion of the client device's cache to form a secured clipboard (e.g., local to the client device, or extendable to other devices), that can be at least part of the secured container 418. The embedded browser can be integrated with the client application to ensure that traffic related to network applications is routed through and/or processed in the client application, which can provide the client application with real-time visibility to the traffic (e.g., when decrypted through the client application). This visibility to the traffic can allow the client application to perform or facilitate policy-based management (e.g., including data loss prevention (DLP) capabilities), application control, and collection and production of analytics.

In some embodiments, the embedded browser incorporates one or more other components of the client application 404, such as the cloud services agent 414, remote session agent 416 and/or secure container 418. For instance, a user can use the cloud services agent 414 of the embedded browser to interoperate with the access gateway 422 (sometimes referred to as CIS) to access a network application. For example, the cloud services agent 414 can execute within the embedded browser, and can receive and transmit navigation commands from the embedded browser to a hosted network application. The cloud services agent can use a remote presentation protocol to display the output generated by the network application to the embedded browser. For example, the cloud services agent 414 can include a HTML5 web client that allows end users to access remote desktops and/or applications on the embedded browser.

The client application 404 and CEB operate on the application layer of the operational (OSI) stack of the client device. The client application 404 can include and/or execute one or more agents that interoperate with the cloud services 408. The client application 404 can receive, obtain, retrieve or otherwise access various policies (e.g., an enterprise's custom, specified or internal policies or rules) and/or data (e.g., from an access gateway 422 and/or network device(s) of cloud services 408, or other server(s), that may be managed by the enterprise). The client application can access the policies and/or data to control and/or manage a network application (e.g., a SaaS, web or remote-hosted application). Control and/or management of a network application can include control and/or management of various aspects of the network application, such as access control, session delivery, available features or functions, service level, traffic management and monitoring, and so on. The network application can be from a provider or vendor of the enterprise (e.g., SALESFORCE.com, SAP, MICROSOFT Office 365), from the enterprise itself, or from another entity (e.g., DROPBOX or GMAIL service).

For example, the cloud services agent 414 can provide policy driven management capabilities and features related to the use and/or access of network applications. For example, the cloud services agent 414 can include a policy engine to apply one or more policies (e.g., received from cloud services) to determine access control and/or connectivity to resources such as network applications. When a session is established between the client application and a server 430 providing a SaaS application for instance, the cloud services agent 414 can apply one or more policies to control traffic levels and/or traffic types (or other aspects) of the session, for instance to manage a service level of the SaaS application. Additional aspects of the application traffic that can be controlled or managed can include encryption level and/or encryption type applied to the traffic, level of interactivity allowed for a user, limited access to certain features of the network application (e.g., print-screen, save, edit or copy functions), restrictions to use or transfer of data obtained from the network application, limit concurrent access to two or more network applications, limit access to certain file repositories or other resources, and so on.

The cloud services agent 414 can convey or feed information to analytics services 424 of the cloud services 408, such as information about SaaS interaction events visible to the CEB. Such a configuration using the CEB can monitor or capture information for analytics without having an inline device or proxy located between the client device and the server(s) 430, or using a SaaS API gateway 'out-of-band' approach. In some embodiments, the cloud services agent 414 does not execute within the embedded browser. In these embodiments, a user can similarly use the cloud services agent 414 to interoperate with the access gateway (or CIS) 422 to access a network application. For instance, the cloud services agent 414 can register and/or authenticate with the access gateway (or CIS) 422, and can obtain a list of the network applications from the access gateway (or CIS) 422. The cloud services agent 414 can include and/or operate as an application store (or storefront) for user selection and/or downloading of network applications. Upon logging in to access a network application, the cloud services agent 414 can intercept and transmit navigation commands from the embedded browser to the network application. The cloud services agent can use a remote presentation protocol to display the output generated by the network application to the embedded browser. For example, the cloud services agent 414 can include a HTML5 web client that allows end users to access remote desktops and/or applications on the embedded browser.

In some embodiments, the cloud services agent 414 provides single sign on (SSO) capability for the user and/or client device to access a plurality of network applications. The cloud services agent 414 can perform user authentication to access network applications as well as other network resources and services, by communicating with the access gateway 422 for instance. For example, the cloud services agent 414 can authenticate or register with the access gateway 422, to access other components of the cloud services 408 and/or the network applications 406. Responsive to the authentication or registration, the access gateway 422 can perform authentication and/or SSO for (or on behalf of) the user and/or client application, with the network applications.

The client application 404 can include a networking agent 412. The networking agent 412 is sometimes referred to as a software-defined wide area network (SD-WAN) agent, mVPN agent, or microVPN agent. The networking agent 412 can establish or facilitate establishment of a network connection between the client application and one or more resources (e.g., server 430 serving a network application). The networking agent 412 can perform handshaking for a requested connection from the client application to access a network application, and can establish the requested connection (e.g., secure or encrypted connection). The networking agent 412 can connect to enterprise resources (including services) for instance via a virtual private network (VPN). For example, the networking agent 412 can establish a secure socket layer (SSL) VPN between the client application and a server 430 providing the network application 406. The VPN connections, sometimes referred to as microVPN or application-specific VPN, may be specific to particular network applications, particular devices, particular secured areas on the client device, and the like, for instance as discussed above in connection with FIG. 3. Such VPN connections can carry MICROSOFT Exchange traffic, MICROSOFT Active Directory traffic, HyperText Transfer Protocol (HTTP) traffic, HyperText Transfer Protocol Secure (HTTPS) traffic, as some examples.

The remote session agent 416 (sometimes referred to as HDX engine) can include features of the client agent 304 discussed above in connection with FIG. 2 for instance, to support display a remoting protocol (e.g., HDX or ICA). In some embodiments, the remote session agent 416 can establish a remote desktop session and/or remote application session in accordance to any variety of protocols, such as the Remote Desktop Protocol (RDP), Appliance Link Protocol (ALP), Remote Frame Buffer (RFB) Protocol, and ICA Protocol. For example, the remote session agent 416 can establish a remote application session for a user of the client device to access an enterprise network application. The remote session agent 416 can establish the remote application session within or over a secure connection (e.g., a VPN) established by the networking agent 412 for instance.

The client application or CEB can include or be associated with a secure container 418. A secure container can include a logical or virtual delineation of one or more types of resources accessible within the client device and/or accessible by the client device. For example, the secure container 418 can refer to the entirety of the secured portion of the digital workspace, or particular aspect(s) of the secured portion. In some embodiments, the secure container 418 corresponds to a secure cache (e.g., electronic or virtual clipboard), and can dynamically incorporate a portion of a local cache of each client device of a user, and/or a cloud-based cache of the user, that is protected or secured (e.g., encrypted). The secure container can define a portion of file system(s), and/or delineate resources allocated to a CEB and/or to network applications accessed via the CEB. The secure container can include elements of the secure data container 228 discussed above in connection with FIG. 2 for example. The CEB can be configured (e.g., via policies) to limit, disallow or disable certain actions or activities on resources and/or data identified to be within a secure container. A secured container can be defined to specify that the resources and/or data within the secure container are to be monitored for misuse, abuse and/or exfiltration.

In certain embodiments, a secure container relates to or involves the use of a secure browser (e.g., embedded browser 410 or secure browser 420) that implements various enterprise security features. Network applications (or web pages accessed by the secure browser) that are configured to run within the secure browser can effectively inherit the security mechanisms implemented by the secure browser. These network applications can be considered to be contained within the secure container. The use of such a secure browser can enable an enterprise to implement a content filtering policy in which, for example, employees are blocked from accessing certain web sites from their client devices. The secure browser can be used, for example, to enable client device users to access a corporate intranet without the need for a VPN.

In some embodiments, a secure container can support various types of remedial actions for protecting enterprise resources. One such remedy is to lock the client device, or a secure container on the client device that stores data to be protected, such that the client device or secure container can only be unlocked with a valid code provided by an administrator for instance. In some embodiments, these and other types of remedies can be invoked automatically based on conditions detected on the client device (via the application of policies for instance), or can be remotely initiated by an administrator.

In some embodiments, a secure container can include a secure document container for documents. A document can comprise any computer-readable file including text, audio, video, and/or other types of information or media. A document can comprise any single one or combination of these media types. As explained herein, the secure container can help prevent the spread of enterprise information to different applications and components of the client device, as well as to other devices. The enterprise system (which can be partially or entirely within a cloud network) can transmit documents to various devices, which can be stored within the secure container. The secure container can prevent unauthorized applications and other components of the client device from accessing information within the secure container. For enterprises that allow users to use their own client devices for accessing, storing, and using enterprise data, providing secure container on the client devices helps to secure the enterprise data. For instance, providing secure containers on the client devices can centralize enterprise data in one location on each client device, and can facilitate selective or complete deletion of enterprise data from each client device when desired.

The secure container can include an application that implements a file system that stores documents and/or other types of files. The file system can comprise a portion of a computer-readable memory of the client device. The file system can be logically separated from other portions of the computer-readable memory of the client device. In this way, enterprise data can be stored in a secure container and private data can be stored in a separate portion of the computer-readable memory of the client device for instance. The secure container can allow the CEB, network applications accessed via the CEB, locally installed applications and/or other components of the client device to read from, write to, and/or delete information from the file system (if authorized to do so). Deleting data from the secure container can include deleting actual data stored in the secure container, deleting pointers to data stored in the secure container, deleting encryption keys used to decrypt data stored in the secure container, and the like. The secure container can be installed by, e.g., the client application, an administrator, or the client device manufacturer. The secure container can enable some or all of the enterprise data stored in the file system to be deleted without modifying private data stored on the client device outside of the secure container. The file system can facilitate selective or complete deletion of data from the file system. For example, an authorized component of the enterprise's system can delete data from the file system based on, e.g., encoded rules. In some embodiments, the client application can delete the data from the file system, in response to receiving a deletion command from the enterprise's system.

The secure container can include an access manager that governs access to the file system by applications and other components of the client device. Access to the file system can be governed based on document access policies (e.g., encoded rules) maintained by the client application, in the documents and/or in the file system. A document access policy can limit access to the file system based on (1) which application or other component of the client device is requesting access, (2) which documents are being requested, (3) time or date, (4) geographical position of the client device, (5) whether the requesting application or other component provides a correct certificate or credentials, (6) whether the user of the client device provides correct credentials, (7) other conditions, or any combination thereof. A user's credentials can comprise, for example, a password, one or more answers to security questions (e.g., What is the mascot of your high school?), biometric information (e.g., fingerprint scan, eye-scan), and the like. Hence, by using the access manager, the secure container can be configured to be accessed only by applications that are authorized to access the secure container. As one example, the access manager can enable enterprise applications installed on the client device to access data stored in the secure container and to prevent non-enterprise applications from accessing the data stored in the secure container.

Temporal and geographic restrictions on document access may be useful. For example, an administrator may deploy a document access policy that restricts the availability of the documents (stored within the secure container) to a specified time window and/or a geographic zone (e.g., as determined by a GPS chip) within which the client device must reside in order to access the documents. Further, the document access policy can instruct the secure container or client application to delete the documents from the secure container or otherwise make them unavailable when the specified time period expires or if the client device is taken outside of the defined geographic zone.

Some documents can have access policies that forbid the document from being saved within the secure container. In such embodiments, the document can be available for viewing on the client device only when the user is logged in or authenticated via the cloud services for example.

The access manager can also be configured to enforce certain modes of connectivity between remote devices (e.g., an enterprise resource or other enterprise server) and the secure container. For example, the access manager can require that documents received by the secure container from a remote device and/or sent from the secure container to the remote device be transmitted through secured tunnels/connections, for example. The access manager can require that all documents transmitted to and from the secure container be encrypted. The client application or access manager can be configured to encrypt documents sent from the secure container and decrypt documents sent to the secure container. Documents in the secure container can also be stored in an encrypted form.

The secure container can be configured to prevent documents or data included within documents or the secure container from being used by unauthorized applications or components of the client device or other devices. For instance, a client device application having authorization to access documents from the secure container can be programmed to prevent a user from copying a document's data and pasting it into another file or application interface, or locally saving the document or document data as a new file outside of the secure container. Similarly, the secure container can include a document viewer and/or editor that do not permit such copy/paste and local save operations. Moreover, the access manager can be configured to prevent such copy/paste and local save operations. Further, the secure container and applications programmed and authorized to access documents from the secure container can be configured to prevent users from attaching such documents to emails or other forms of communication.

One or more applications (e.g., applications installed on the client device, and/or network applications accessed via the CEB) can be programmed or controlled (e.g., via policy-based enforcement) to write enterprise-related data only into the secure container. For instance, an application's source code can be provided with the resource name of the secure container. Similarly, a remote application (e.g., executing on a device other than the client device) can be configured to send data or documents only to the secure container (as opposed to other components or memory locations of the client device). Storing data to the secure container can occur automatically, for example, under control of the application, the client application, and/or the secure browser. The client application can be programmed to encrypt or decrypt documents stored or to be stored within the secure container. In certain embodiments, the secure container can only be used by applications (on the client device or a remote device) that are programmed to identify and use the secure container, and which have authorization to do so.

The network applications 406 can include sanctioned network applications 426 and non-sanctioned network applications 428. By way of a non-limiting example, sanctioned network applications 426 can include network applications from Workday, SALESFORCE, Office 365, SAP, and so on, while non-sanctioned network applications 426 can include network applications from DROPBOX, GMAIL, and so on. For instance, FIG. 4 illustrates a case where sanctioned applications 426 are accessed via a CEB. In operation (1), a user instance of a client application 404, that is installed on client device 402, can register or authenticate with the access gateway 422 of cloud services 408. For example, the user can authenticate the user to the client device and login to the client device 402. The client application can automatically execute, or be activated by the user. In some embodiments, the user can sign in to the client application (e.g., by authenticating the user to the client application). In response to the login or sign-in, the client application can register or authenticate the user and/or the client application with the access gateway 422.

In operation (2), in response to the registration or authentication, the access gateway 422 can identify or retrieve a list of enumerated network applications available or pre-assigned to the user, and can provide the list to the client application. For example, in response to the registration or authentication, the access gateway can identify the user and/or retrieve a user profile of the user. According to the identity and/or user profile, the access gateway can determine the list (e.g., retrieve a stored list of network applications matched with the user profile and/or the identity of the user). The list can correspond to a list of network applications sanctioned for the user. The access gateway can send the list to the client application or embedded browser, which can be presented via the client application or embedded browser to the user (e.g., in a storefront user interface) for selection.

In operation (3), the user can initiate connection to a sanctioned network application (e.g., a SaaS application), by selecting from the list of network applications presented to the user. For example, the user can click on an icon or other representation of the sanctioned network application, displayed via the client application or embedded browser. This user action can trigger the CEB to transmit a connection or access request to a server that provisions the network application. The request can include a request to the server (e.g., SaaS provider) to communicate with the access gateway to authenticate the user. The server can send a request to the access gateway to authenticate the user for example.

In operation (4), the access gateway can perform SSO with the server, to authenticate the user. For example, in response to the server's request to authenticate the user, the access gateway can provide credentials of the user to the server(s) 430 for SSO, to access the selected network application and/or other sanctioned network applications. In operation (5), the user can log into the selected network application, based on the SSO (e.g., using the credentials). The client application (e.g., the networking agent 412 and/or the remote session agent 416) can establish a secure connection and session with the server(s) 430 to access the selected network application. The CEB can decrypt application traffic received via the secure connection. The CEB can monitor traffic sent via the CEB and the secured connection to the servers 430.

In operation (6), the client application can provide information to the analytics services 424 of cloud services 408, for analytics processing. For example, the cloud services agent 414 of the client application 404 can monitor for or capture user interaction events with the selected network application. The cloud services agent 414 can convey the user interaction events to the analytics services 424, to be processed to produce analytics.

Figure 5:
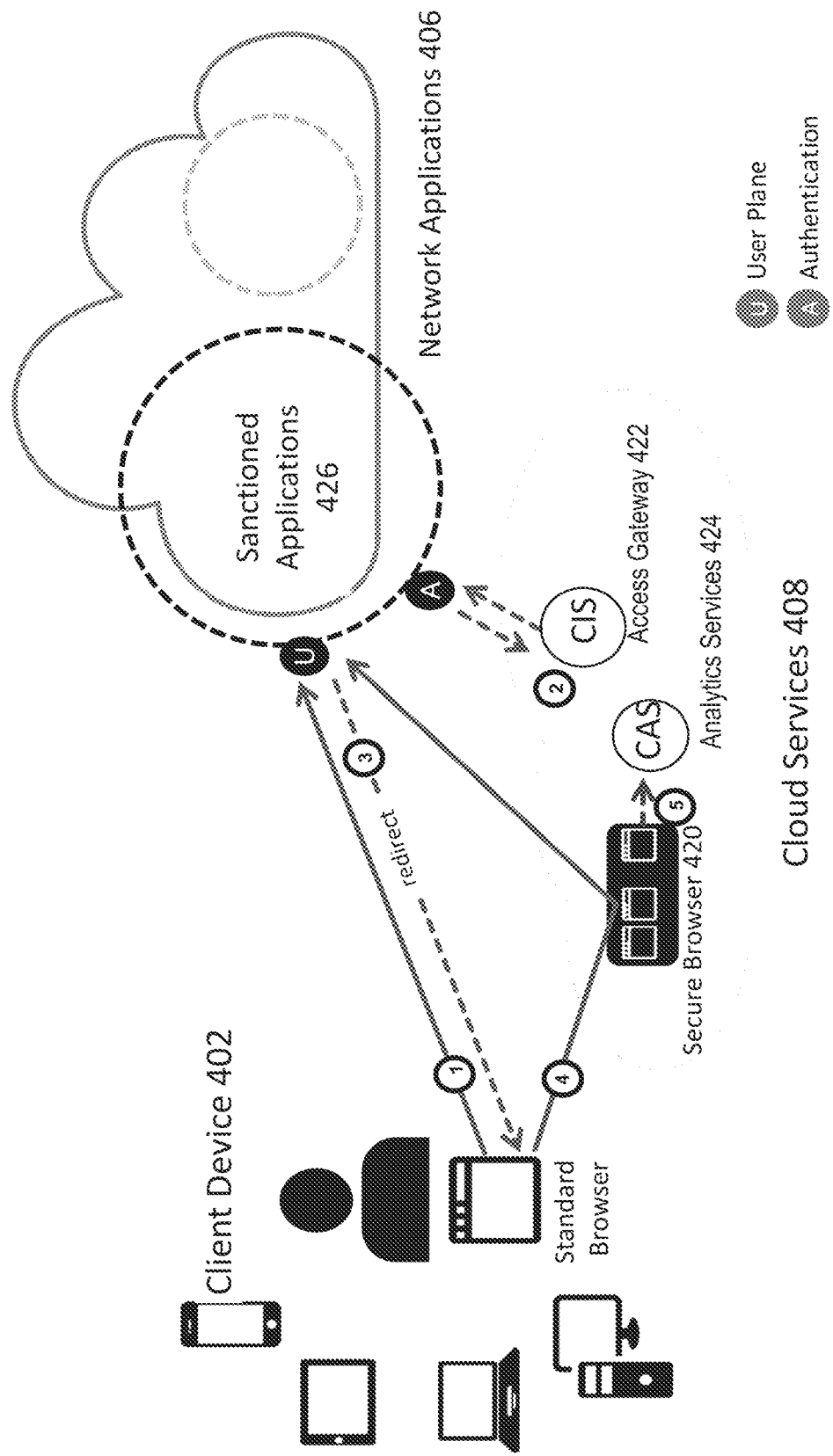
FIG. 5 is a block diagram of an example embodiment of a system for using a secure browser.

FIG. 5 depicts an example embodiment of a system for using a secure browser. In brief overview, the system includes cloud services 408, network applications 406 and client device 402. In some embodiments, various elements of the system are similar to that described above for FIG. 4, but that the client application (with embedded browser) is not available in the client device 402. A standard or typical browser may be available on the client device, from which a user can initiate a request to access a sanctioned network application for instance. A network application can be specified as being sanctioned or unsanctioned via policies that can be set by an administrator or automatically (e.g., via artificial intelligence).

For example, in operation (1), the user may log into the network application using the standard browser. For accessing a sanctioned network application, the user may access a predefined URL and/or corresponding webpage of a server that provisions the network application, via the standard browser, to initiate a request to access the network application. In some embodiments, the request can be forwarded to or intercepted by a designated gateway service (e.g., in a data path of the request). For example, the gateway service can reside on the client device (e.g., as an executable program), or can reside on a network device 432 of the cloud services 408 for instance. In some embodiments, the access gateway can correspond to or include the gateway service. The gateway service can determine if the requested network application is a sanctioned network application. The gateway service can determine if a CEB initiated the request. The gateway service can detect or otherwise determine that the request is initiated from a source (e.g., initiated by the standard browser) in the client device other than a CEB. In some embodiments, there is no requirement for a designated gateway service to detect or determine if the request is initiated from a CEB, for example if the requested network application is sanctioned, that user is initiating the request via a standard browser, and/or that the predefined URL and/or corresponding webpage is accessed.

In operation (2), the server may authenticate the user via the access gateway of the cloud services 408. The server may communicate with the access gateway to authenticate the user, in response to the request. For instance, the request can include an indication to the server to communicate with the access gateway to authenticate the user. In some embodiments, the server is pre-configured to communicate with the access gateway to authenticate the user, for requests to access a sanctioned network application. The server may send a request to the access gateway to authenticate the user. In response to the server's request to authenticate the user, the access gateway can provide credentials of the user to the server 430.

In operation (3), the gateway service and/or the server can direct (or redirect) all traffic to a secure browser 420 which provides a secure browsing service. This may be in response to at least one of: a determination that the requested network application is a sanctioned network application, a determination that the request is initiated from a source other than a CEB, a determination that the requested network application is sanctioned, a determination that user is initiating the request via a standard browser, and/or a determination that the predefined URL and/or corresponding webpage is accessed.

The user's URL session can be redirected to the secure browser. For example, the server, gateway service and/or the access gateway can generate and/or send a URL redirect message to the standard browser, responsive to the determination. The secure browser plug-in of the standard browser can receive the URL redirect message, and can for example send a request to access the non-sanctioned network application, to the secure browser 420. The secure browser 420 can direct the request to the server of the non-sanctioned network application. The URL redirect message can instruct the standard browser (and/or the secure browser plug-in) to direct traffic (e.g., destined for the network application) from the standard browser to the secure browser 420 hosted on a network device. This can provide clientless access and control via dynamic routing though a secure browser service. In some embodiments, a redirection of all traffic to the secure browser 420 is initiated or configured, prior to performing authentication of the user (e.g., using SSO) with the server.

In some embodiments, the gateway service can direct or request the server of the requested network application to communicate with the secure browser 420. For example, the gateway service can direct the server and/or the secure browser to establish a secured connection between the server and the secure browser, for establishing an application session for the network application.

In some embodiments, the secured browser 420 comprises a browser that is hosted on a network device 432 of the cloud services 408. The secured browser 420 can include one or more features of the secured browser 420 described above in connection with at least FIG. 4 for instance. The hosted browser can include an embedded browser of a CEB that is hosted on the network device 432 instead of on the client device. The hosted browser can include an embedded browser of a hosted virtualized version of the CEB that is hosted on the network device 432. Similar to the CEB installed on the client device, traffic is routed through the CEB hosted on the network device, which allows an administrator to have visibility of the traffic through the CEB and to remain in control for security policy control, analytics, and/or management of performance.

Figure 6:
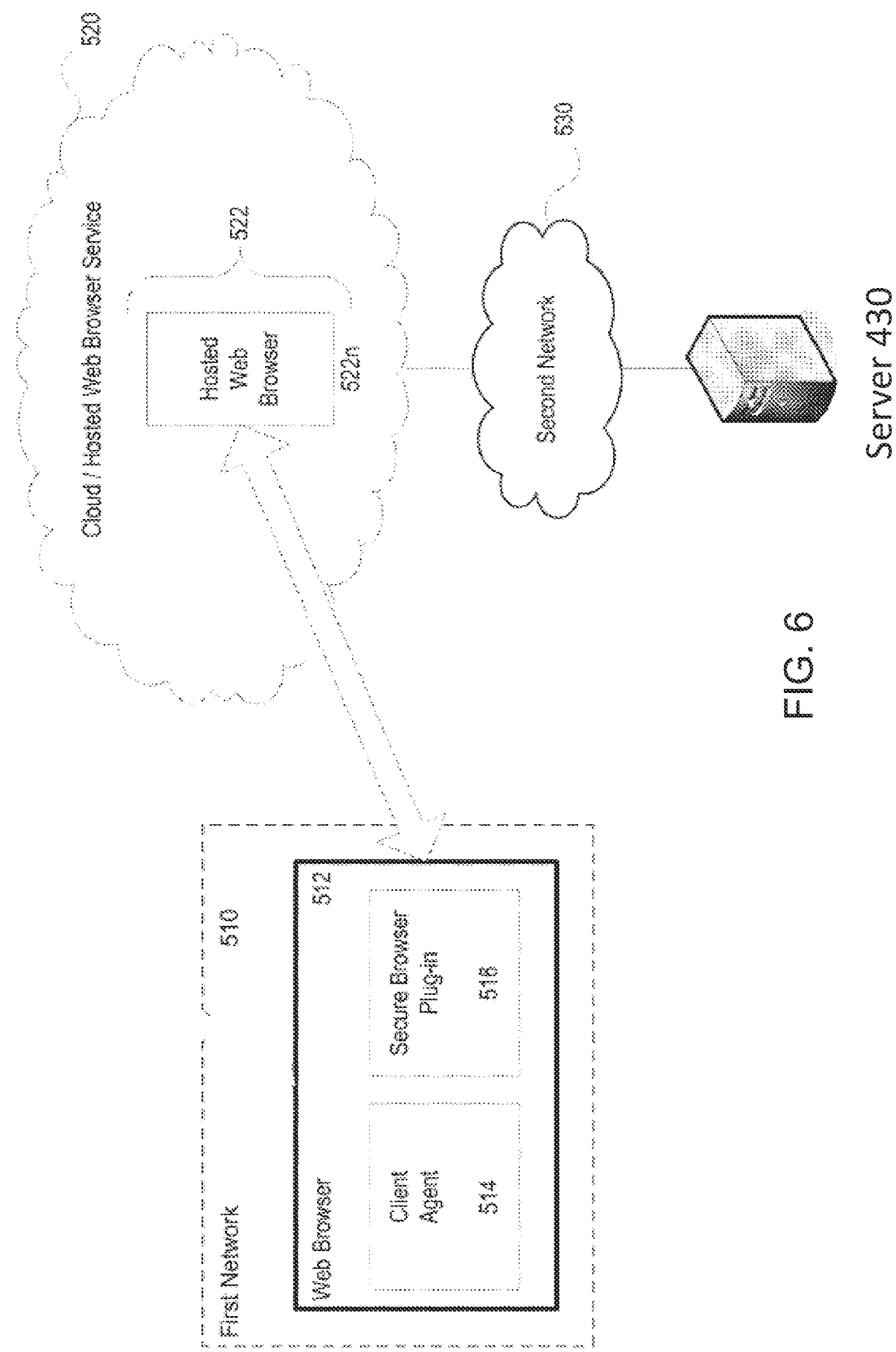

FIG. 6 illustrates an example implementation for browser redirection using a secure browser plug-in. In brief overview, the implementation includes a web browser 512 with a secure browser plug-in 516 operating on a client device, and a hosted web browser (or secure browser) 522 residing on a network device. The web browser 512 can correspond to a standard browser, instead of an embedded browser as discussed above in connection with FIG. 4 for example. The secure browser plug-in 516 can execute within a first network 510 and access a server 430 in a second network 530. The first network 510 and the second network 530 are for illustration purposes and may be replaced with fewer or additional computer networks. A secure browser plug-in 516 can be installed on the standard browser 512. The plug-in can include one or more components. One such component can include an ActiveX control or JAVA control or any other type and/or form of executable instructions capable of loading into and executing in the standard browser. For example, the standard browser can load and run an Active X control of the secure browser plug-in 516, in a memory space or context of the standard browser. In some embodiments, the secure browser plug-in can be installed as an extension on the standard browser, and a user can choose to enable or disable the plugin or extension. The secure browser plug-in can communicate and/or operate with the secured browser 420 for securing, using and/or accessing resources within the secured portion of the digital workspace.

By using the secure browser plug-in 516 operating within the standard browser 512 network applications accessed via the standard browser 512 can be redirected to a hosted secure browser. For instance, the secure browser plug-in 516 can be implemented and/or designed to detect that a network application is being accessed via the standard browser, and can direct/redirect traffic from the client device associated with the network application, to the hosted secure browser. The hosted secure browser can direct traffic received from the network application, to the secure browser plug-in 516 and/or a client agent 514 for rendering and/or display for example. The client agent 514 can execute within the web browser 512 and/or the secure browser plug-in, and can include certain elements or features of the client application 404 discussed above in connection with at least FIG. 4 for example. For instance, the client agent 514 can include a remote session agent 416 for rendering the network application at the web browser 512. In some embodiments, the network application is rendered at the hosted secure browser, and the rendered data is conveyed or mirrored to the secure browser plug-in 516 and/or the client agent 514 for processing and/or display.

By way of an example, a user may be working remotely and may want to access a network application that is internal to a secure corporate network while the user is working on a computing device connected to an unsecure network. In this case, the user may be utilizing the standard browser 512 executing in the first network 510, in which the first network 510 may comprise an unsecure network. The server 430 that the user wants to access may be on the second network 530, in which the second network 530 comprises a secure corporate network for instance. The user might not be able to access the server 430 from the unsecure first network 510 by clicking on an internal uniform record locator (URL) for the secure website 532. That is, the user may need to utilize a different URL (e.g., an external URL) while executing the standard browser 512 from the external unsecure network 510. The external URL may be directed to or may address one or more hosted web browsers 522 configured to access server(s) 430 within the second network 530 (e.g., secure network). To maintain secure access, the secure browser plug-in 516 may redirect an internal URL to an external URL for a hosted secure browser.

The secure browser plug-in 516 may be able to implement network detection in order to identify whether or not to redirect internal URLs to external URLs. The standard browser 512 may receive a request comprising an internal URL for a website executing within the secure network. For example, the standard browser 512 may receive the request in response to a user entering a web address (e.g., for secure website 532) in the standard browser. The secure browser plug-in 516 may redirect the user web browser application 512 from the internal URL to an external URL for a hosted web browser application. For example, the secure browser plug-in 516 may replace the internal URL with an external URL for the hosted web browser application 522 executing within the secure network 530.

The secure browser plug-in 516 may allow the client agent 514 to be connected to the hosted web browser application 522. The client agent 514 may comprise a plug-in component, such as an ActiveX control or JAVA control or any other type and/or form of executable instructions capable of loading into and executing in the standard browser 512. For example, the client agent 514 may comprise an ActiveX control loaded and run by a standard browser 512, such as in the memory space or context of the user web browser application 512. The client agent 514 may be pre-configured to present the content of the hosted web browser application 522 within the user web browser application 512.

The client agent 514 may connect to a server or the cloud/hosted web browser service 520 using a thin-client or remote-display protocol to present display output generated by the hosted web browser application 522 executing on the service 520. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the MICROSOFT Corporation of Redmond, Wash.

The hosted web browser application 522 may navigate to the requested network application in full-screen mode, and can render the requested network application. The client agent 514 may present the content or rendition of the network application on the web browser application 512 in a seamless and transparent manner such that it appears that the content is being displayed by the standard browser 512, e.g., based on the content being displayed in full screen mode. In other words, the user may be given the impression that the web site content is displayed by the user web browser application 512 and not by the hosted web browser application 522. The client agent 514 may transmit navigation commands generated by the user web browser application 512 to the hosted web browser application 522 using the thin-client or remote-display protocol. Changes to the display output of the hosted web browser application 522, due to the navigation commands, may be reflected in the user web browser application 512 by the client agent 514, giving the impression to the user that the navigation commands were executed by the user web browser application 512.

Referring again to FIG. 5, and in operation (4), a new browser tab can open on the standard browser, to render or display the secure browser session. The new browser tab can be established or opened by the secure browser plug-in for instance. The secure browser plug-in and/or a client agent can receive data from the secure browser session, and can render the network application within the new browser tab as discussed above in connection with FIG. 6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the inter-operation of cloud services and a secure browser (in the absence of the client application).

Figure 7:
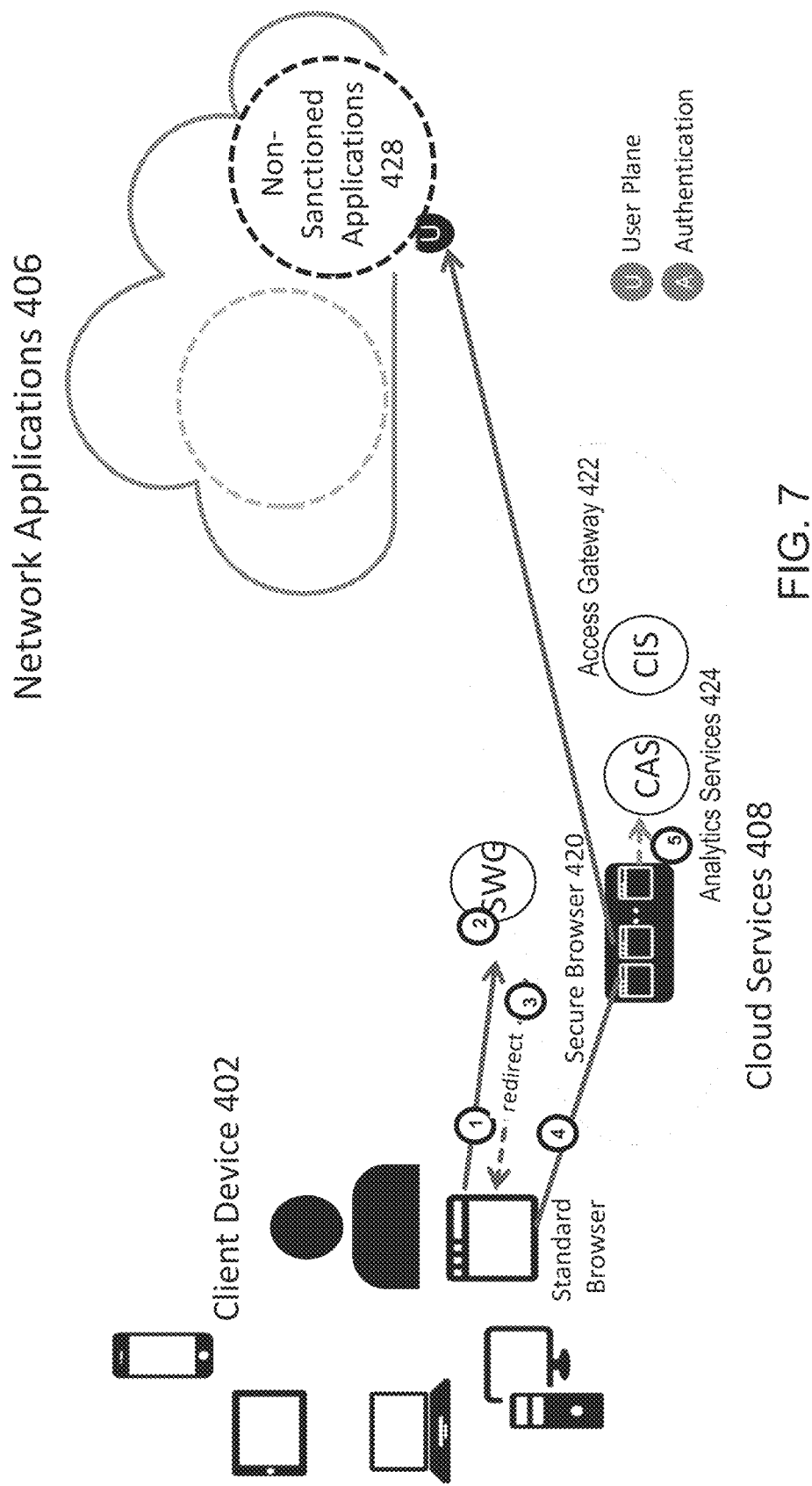
FIG. 7 is a block diagram of example embodiment of a system of using a secure browser.

FIG. 7 depicts another example embodiment of a system of using a secure browser. In brief overview, the system includes cloud services 408, network applications 406 and the client device 402. In some embodiments, various elements of the system are similar to that described above for FIG. 5. A client application with embedded browser is not available in the client device 402. A standard or typical (e.g., HTML5) browser is available on the client device, from which a user can initiate a request to access a non-sanctioned network application. A network application can be specified as being sanctioned or non-sanctioned via policies that can be set by an administrator or automatically (e.g., via artificial intelligence).

In operation (1), the user may attempt to log into a non-sanctioned network application using the standard browser. The user may attempt to access a webpage of a server that provisions the network application, and to initiate a request to access the network application. In some embodiments, the request can be forwarded to or intercepted by a designated gateway service (e.g., in a data path of the request). For example, the gateway service (sometimes referred to as SWG) can reside on the client device (e.g., as an executable program), or can reside on a network device 432 of the cloud services 408 for instance. The gateway service can detect or otherwise determine if the requested network application is a sanctioned network application. The gateway service can determine if a CEB initiated the request. The gateway service can detect or otherwise determine that the request is initiated from a source (e.g., initiated by the standard browser) in the client device other than a CEB.

In operation (2), the gateway service detects that the requested network application is a non-sanctioned network application. The gateway service can for instance extract information from the request (e.g., destination address, name of the requested network application), and compare the information against that from a database of sanctioned and/or non-sanctioned network applications. The gateway service can determine, based on the comparison, that the requested network application is a non-sanctioned network application.

In operation (3), responsive to the determination, the gateway service can block access to the requested network application, e.g., by blocking the request. The gateway service can generate and/or send a URL redirect message to the standard browser, responsive to the determination. The URL redirect message can be similar to a URL redirect message sent from the server to the standard browser in FIG. 5 in operation (3). A secure browser plug-in of the standard browser can receive the URL redirect message, and can for example send a request to access the non-sanctioned network application, to the secure browser 420. The secure browser 420 can direct the request to the server of the non-sanctioned network application.

The server of the non-sanctioned network application may authenticate the user via the access gateway of the cloud services 408, e.g., responsive to receiving the request from the secure browser. The server may communicate with the access gateway to authenticate the user, in response to the request. The server may send a request to the access gateway to authenticate the user. In response to the server's request to authenticate the user, the access gateway can provide credentials of the user to the server 430. Upon authentication, the secure browser (or a corresponding CEB) can establish a secured connection and an application session with the server.

In operation (4), a new browser tab can open on the standard browser, to render or display the secure browser's application session. The new browser tab can be established or opened by the secure browser plug-in for instance. The secure browser plug-in and/or a client agent can receive data from the secure browser session, and can render the network application within the new browser tab as discussed above in connection with FIGS. 5-6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the inter-operation of cloud services and a secure browser (in the absence of the client application).

In some embodiments, in the absence or non-availability of a CEB on the client device, browser redirection is performed so that each requested network application is accessed via a corresponding hosted secure browser (or hosted CEB) for handling, instead of having all traffic redirected through a single hosted secure browser (or hosted CEB). Each dedicated secure browser can provide compartmentalization and improved security.

The use of a CEB, whether hosted or local to the client device, can allow for end-to-end visibility of application traffic for analytics, service level agreement (SLA), resource utilization, audit, and so on. In addition to such visibility, the CEB can be configured with policies for managing and controlling any of these as well as other aspects. For example, DLP features can be supported, to control "copy and paste" activities, download of files, sharing of files, and to implement watermarking for instance. As another example, the CEB can be configured with policies for managing and controlling access to local drives and/or device resources such as peripherals.

Figure 8:
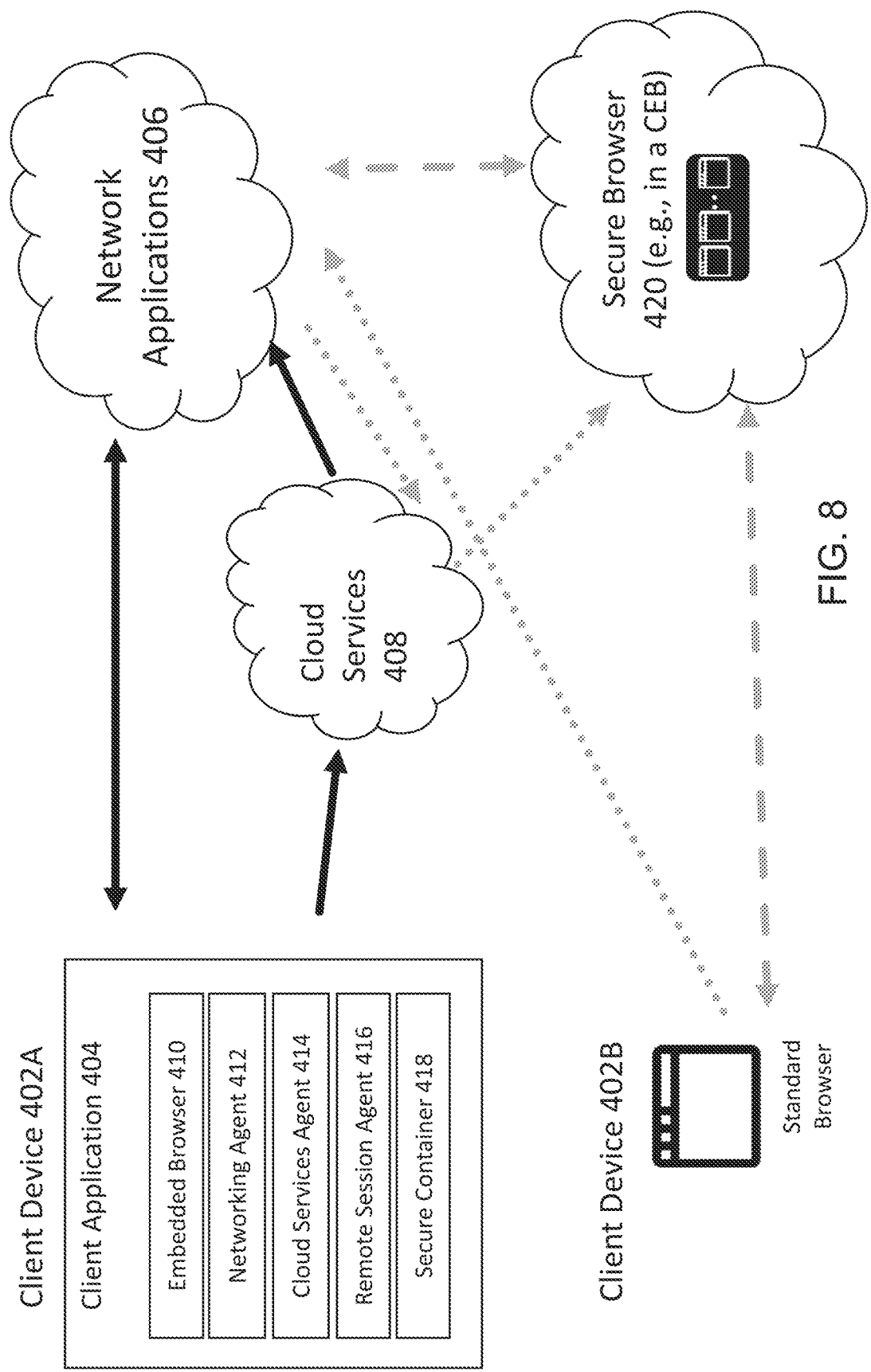
FIG. 8 is a block diagram of an example embodiment of a system for using local embedded browser(s) and hosted secured browser(s)

Referring now to FIG. 8, an example embodiment of a system for using local embedded browser(s) and hosted secured browser(s) is depicted. An environment is shown where different types of client devices 402A, 402B may be used (e.g., in a BYOD context), such that one may be locally equipped with a suitable CEB, and another client device may not have a suitable local CEB installed. In such an environment, systems described in FIGS. 4, 5 and 7 can be used to support each of the client devices based on the availability of a locally installed and suitable CEB.

Figure 9:
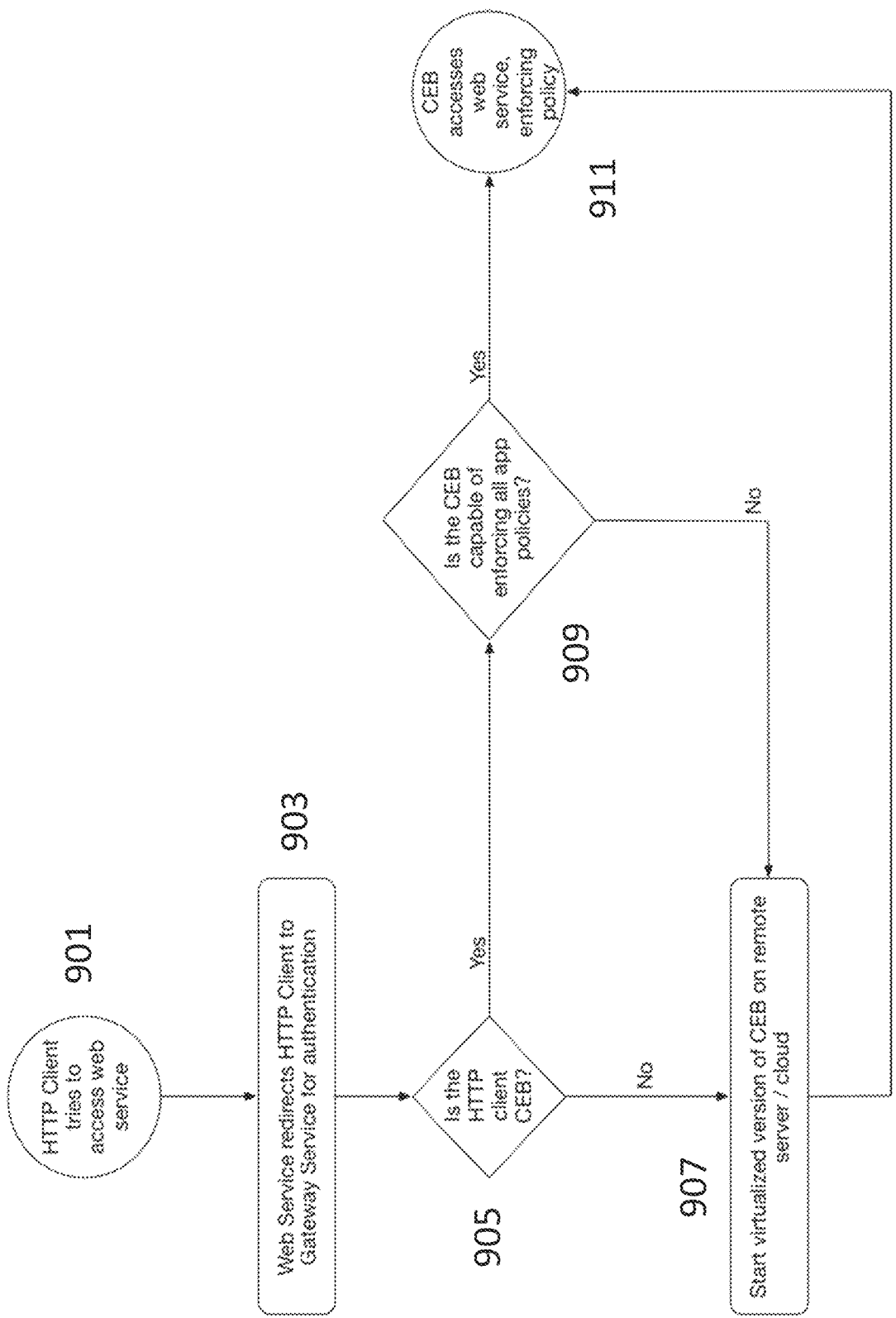
FIG. 9 is an example process flow for using local embedded browser(s) and hosted secured browser(s)

FIG. 9 depicts an example process flow for using local embedded browser(s) and hosted secured browser(s). The process flow can be used in the environment described above in FIG. 8, to determine whether an embedded browser or a hosted secured browser should be used for each client device to access a network application. For example, in operation 901, a HTTP client can attempt to access a web service (e.g., server of a network application). In operation 903, the web service can redirect the HTTP client to a gateway service for authentication. In operation 905, the gateway service can determine if the HTTP client is a CEB. If so, in operation 909, the gateway service can determine if the CEB is a suitable CEB, e.g., capable of enforcing defined application policies. If so, in operation 911, the CEB is allowed access to the web service, and can enforce the defined policies.

If the gateway service determines that the HTTP client is not a CEB, the gateway service can cause a virtualized version of a CEB to be initialized and hosted on a remote server (e.g., a network device 432 of cloud services 408), in operation 907. In some embodiments, such a hosted CEB may already be available on a network device 432, and can be selected for use. For example in operation 911, the CEB is allowed access to the web service, and can enforce the defined policies.

If the gateway service determines that the HTTP client is a CEB, but that the CEB is not a suitable CEB, the gateway service can cause a virtualized version of a CEB to be initialized and hosted on a remote server (e.g., a network device 432 of cloud services 408), in operation 907. In some embodiments, such a hosted CEB may already be available on a network device 432, and can be selected for use. For example in operation 911, the CEB is allowed access to the web service, and can enforce the defined policies.

In some embodiments, if the user is requesting access to a web application located in a company data center, the gateway service (in cloud service or on premise) can allow access when the client application with CEB is detected. Otherwise, the request can be routed to a service with the hosted virtualized version of the CEB, and then access is authenticated and granted.

At operation 905 and/or operation 909 for instance, the decisions made on whether the HTTP client is a CEB and whether it is a suitable CEB may be determined by a number of factors. For example, to determine if the HTTP client is CEB, the gateway service may take into account factors, for example including at least one of: user Identity and strength of authentication, client Location, client IP Address, how trusted the user identity, client location, client IP are, jailbreak status of the client device, status of anti-malware software, compliance to corporate policy of the client device, and/or remote attestation or other evidence of integrity of the client software.

To determine if the CEB is able to honor or support all defined application policies (which may vary by client version, client OS platform and other factors), the client device's software and gateway service may perform capability negotiation and/or exchange version information. In some embodiments, the gateway service can query or check a version number or identifier of the CEB to determine if the CEB is a suitable CEB to use.

Driving all the traffic though the CEB then allows additional control of content accessing SaaS and Web based systems. Data Loss Prevention (DLP) of SaaS and Web traffic can be applied through the CEB app with features including copy and paste control to other CEB access applications or IT managed devices. DLP can also be enforced by enabling content to be downloaded only to designated file servers or services under IT control.

Figure 10:
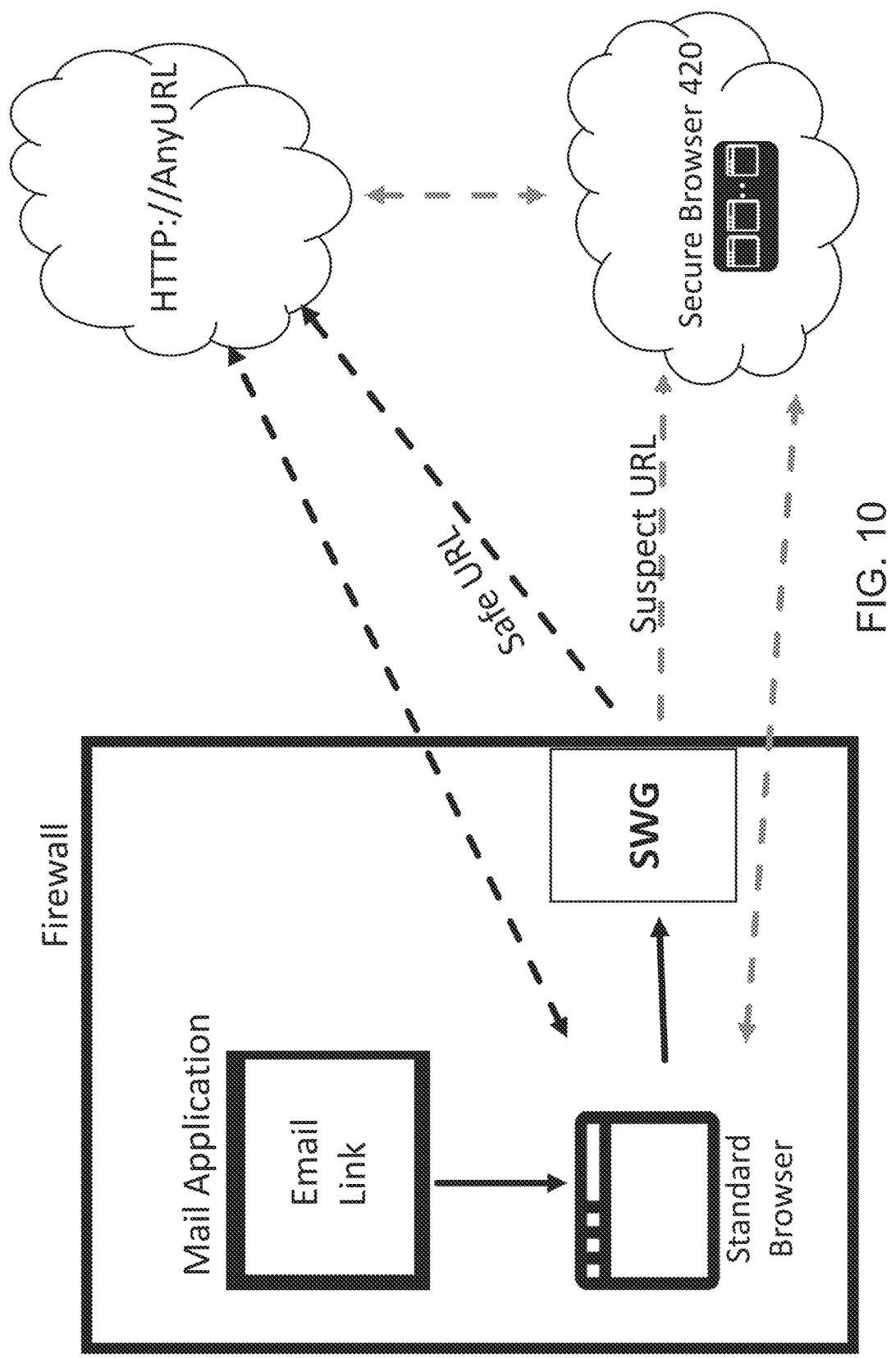
FIG. 10 is an example embodiment of a system for managing user access to webpages.

Referring now to FIG. 10, depicted is an example embodiment of a system for managing user access to webpages. Some webpages (or websites) are known to be safe while others may be suspect. A user may access a webpage via a corresponding URL through a standard browser. For example, the user may click on a link corresponding to the URL, which may be included in an email being viewed using a mail application. An access gateway (SWG) may intercept an access request generated by the clicking of the link, and can determine if the corresponding URL is safe or suspect. If the URL is known to be safe, the access gateway can allow the request to proceed to the corresponding website or web server. If the URL is suspect, the access gateway can redirect the request to be handled via a hosted secure browser. The secure browser can request access for, and access the webpage (on behalf of the standard browser), and can allow the webpage information to be conveyed to the standard browser, similar to the handling of a network application via browser redirection as discussed in connection with at least FIGS. 7 and 5.

C. Systems and Methods for Encapsulating Hypertext Markup Language (HTML)

The present disclosure is directed towards systems and methods for encapsulating hypertext markup language (HTML). An agent (also referred to hereinafter as a transcoding agent) in a remote browser (e.g., executing on a server) can encapsulate HTML from a webpage and send the encapsulated HTML via a remote delivery session to a client device. The encapsulated HTML can be rendered (e.g., into pixels) by a local browser at the client device. Such a processing pipeline is simple and efficient, both in terms of loading latency and overall resource consumption. Such a processing pipeline may bypass any remote rendering of the HTML into pixels (e.g., at the server) to send to the client device, and subsequent transcoding of the pixels (e.g., at the client device). Rather, the local browser can receive the encapsulated HTML and can be utilized directly to render the encapsulated HTML at the client device.

In some embodiments, some aspects of the remote browser may not be compatible with some aspects of the local browser (e.g., in handling a certain portion of the encapsulated HTML). For instance, the local browser may not be able to process or render some portion of the HTML encapsulated by the remote browser. In such embodiments, the remote browser may render a corresponding portion of the HTML from the website to pixels (or pixel form) at the server, and encapsulate a remaining portion of a web page. The pixels (along with the encapsulated HTML portion of the web page) may be communicated to the client device for rendering at the local browser. The local browser may include an HTML5 receiver (or similar agent, application, etc.) to build, generate, or otherwise to transcode the pixels for rendering. For example, the HTML5 receiver may construct or reconstruct HTML from the pixels, for instance. The local browser may then render the HTML that was constructed or reconstructed from the pixels, as well as the portion of encapsulated HTML. Such embodiments may provide for remote rendering of at least some portion of the HTML from the webpage to address browser incompatibility.

The aspects described herein provide for an HTML-to-HTML transcoding scheme (e.g., via the transcoding agent), for instance in a remote browser and local browser configuration (e.g., a remote browser service). The HTML-to-HTML transcoding scheme is in contrast with a HTML-to-pixels-to-HTML transcoding scheme, for instance. In the HTML-to-pixels-to-HTML transcoding scheme, HTML from a webpage is rendered to pixels (or pixel form) at the remote browser. A remote delivery session, such as a delivery session using high definition experience (HDX) protocol, that is established between remote browser and the local browser, can be used to communicate the pixels from the server to the client device. The pixels received by the client device are converted or transcoded to HTML (e.g., by an HTML5 receiver or application running in the local browser), and the HTML is rendered at the local browser. Such an HTML-to-pixels-to-HTML transcoding scheme can inefficient relative to the HTML-to-HTML transcoding scheme. For example, remote rendering to pixels followed by the transcoding of the pixels back to HTML may cause loading latency and may consume additional resources. The HTML-to-HTML transcoding scheme can bypass the remote render stage and subsequent transcoding of pixels to HTML. The HTML-to-HTML transcoding scheme is simpler and can directly utilize the local browser for rendering HTML, which can conserve resources.

In some embodiments, the remote browser service primarily uses an HTML-to-HTML transcoding scheme, although a portion of a web page may be remotely rendered (e.g., into pixel form) for remote delivery to address incompatibility of the local browser with the portion of the web page and/or with the remote browser. The transcoding agent may generate an encapsulated HTML from HTML corresponding to a document of a webpage, website, web application, etc., which may be more "controllable" under various policy controls. For instance, a policy control may be able to regulate or otherwise control user interactions with the encapsulated HTML rendered at the local browser, to a larger extent than non-encapsulated HTML, for example. For instance, the encapsulated HTML rendered at the local browser may allow an enterprise to place a limit on or have control over some user interactions, such as watermarking, cut-paste control, cached content control, and/or other controls that the hosted browser may otherwise permit enterprise users to exert on the HTML.

The transcoding agent may transcode the HTML via several techniques, each of which is discussed in greater detail below. In some embodiments, the transcoding agent may use webcomponent.js (or other web components application programming interface (API)) to generate, create, or provide Shadow document object model (DOM) and/or custom element constructs in the transcoded or encapsulated HTML. A Shadow DOM or custom element construct may encapsulate (or "seal") at least a portion of the original document (e.g., webpage). Such embodiments may make some aspects of the document, such as JAVASCRIPT, extensions, etc., unavailable in an outer DOM of the encapsulated HTML that the local browser exposes.

In some embodiments, some document and/or window objects within the webpage may be virtualized at the remote browser, as part of the encapsulation or transcoding of the HTML. The document and/or window objects may be virtualized to hijack (e.g., re-route, intercept, ignore, disregard, and/or reject) calls to browser services (e.g., navigation, history, XMLHttpRequest (XHR), cached data access, and/or other local resources that may be mapped by browser services). The document and/or window objects may be virtualized by hooking (e.g., inserting code, revising the code, and/or re-coding) the object prototype corresponding to those objects in the DOM being virtualized.

In some embodiments, the remote browser may replace at least a portion of the HTML content from the webpage with a pre-rendered image (e.g., the remote browser may render at least a portion of the HTML content to pixels at the server). The remote browser may encapsulate a remaining portion of the HTML content into encapsulated HTML. The remote browser may maintain a DOM (e.g., a remote DOM at the server) corresponding to the HTML content. The remote browser may communicate the pre-rendered image (or pixels) and encapsulated HTML to the client device (e.g., for rendering at the local browser). The local browser may include an HTML receiver (e.g., an HTML5 receiver) for generating, constructing, etc., HTML from the pre-rendered image or pixels. The local browser may render the encapsulated HTML received by the remote browser. The local browser may maintain a shadow DOM (e.g., a DOM established based on the encapsulated HTML and/or HTML generated from the pre-rendered image or pixels). The local browser may detect, identify, intercept and/or receive events (e.g., user actions, interactions, or other events for the page), which may occur or be reflected in the shadow DOM. The local browser may communicate, convey, direct and/or mirror the events to the remote browser hosted at the server for execution (e.g., for execution on the remote DOM).

Figure 11:
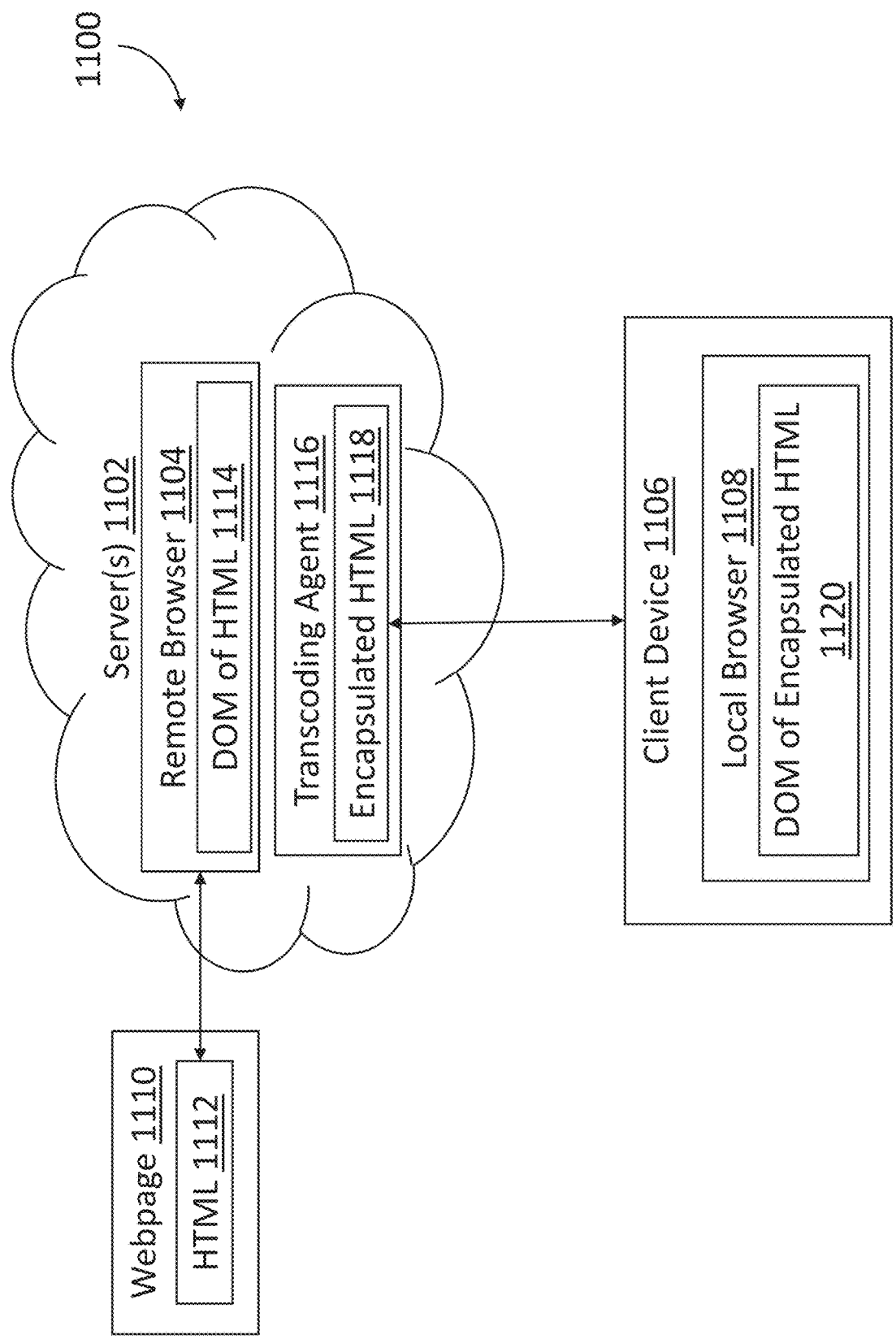
FIG. 11 is a block diagram of one example embodiment of a system for encapsulating hypertext markup language (HTML)

Referring to FIG. 11, depicted is a block diagram of one embodiment of a system 1100 for encapsulating hypertext markup language (HTML). The system 1100 may include a server 1102, which can execute a remote browser 1104, and a client device 1106, which can execute a local browser 1108. A user may request a webpage 1110 to be opened in the local browser 1108. The webpage 1110 may include HTML 1112 that represents, implements or otherwise describes the webpage 1110. The HTML 1114 may be requested by, and can be communicated to the remote browser 1104. The remote browser 1104 may generate, create, provide, or otherwise maintain a document object model (DOM) 1114 of the HTML 1112 corresponding to the webpage 1106. A transcoding agent 1116 may generate encapsulated HTML 1118 from the DOM of the HTML 1114 (and/or from the HTML 1112). The encapsulated HTML 1118 may be communicated from the server 1102 to the client device 1106. The local browser 1108 executing on the client device 1106 may render the encapsulated HTML 1118. The local browser 1108 can render the encapsulated HTML 1118 into pixels for display at the local browser 1108. The local browser 1108 may generate, create, provide, or otherwise maintain a DOM 1120 of the encapsulated HTML corresponding to the webpage 1106.

Each of the above-mentioned elements or entities is implemented in hardware, or a combination of hardware and software, in one or more embodiments. Each component of the system 1100 may be implemented using hardware or a combination of hardware or software detailed above in connection with FIG. 1. For instance, each of these elements or entities can include any application, program, library, script, task, service, process or any type and form of executable instructions executing on hardware of the client device 1106 or the server 1102 for example. The hardware includes circuitry such as one or more processors in one or more embodiments.

The server(s) 1102 may include any embodiment of volatile memory 122 or non-volatile memory 128 and/or processor(3) 103 (discussed in FIG. 1 for example) which may execute, host, implement, provision, or otherwise operate a remote browser 1104. The server(s) 1102 may include one or more elements of any embodiment of the network devices(s) 432, cloud services 408 and/or hosted web browser service 520 described above in connection with FIGS. 4-7 for example. The server(s) 1102 may communicate with other various components of the system 1100 via a communications interface 118. Hence, the server(s) 1102 may be similar in some aspects to the computer 101 described with reference to FIG. 1. The server(s) 1102 may host, maintain, execute, include, or otherwise provide a transcoding agent 1116 configured to encapsulate HTML 1112 from a webpage 1110. The server(s) 1102 may communicate the encapsulated HTML 1118 to the client device 1106 for rendering at the client device 1106 (e.g., in a local browser 1108 of the client device 1106).

The remote browser 1104 may execute on the server(s) 1102. The remote browser 1104 may be configured to request, access, or otherwise retrieve (or receive) data from a webpage 1106. A user operating a local browser (e.g., executing on a client device) may request the webpage 1106 be opened, for example. The user may request the webpage 1106 by, for instance, selecting a hyperlink for the webpage 1106, typing or otherwise providing an address for the webpage 1106 at the local browser, etc. The local browser may provide the request to the remote browser 1104 for execution. The remote server may then request, access, or otherwise retrieve (or receive) data from the webpage 1106 on behalf of the user (responsive to the user's action at the local browser). In some embodiments, the webpage 1106 may be a page from a web application (e.g., an application, such as a network application 406, which may be hosted on server(s) 430 as described above with reference to at least FIGS. 4, 5, 7 and 8).

The webpage 1106 may include HTML 1112. The HTML 1112 for the webpage 1106 may include or correspond to a markup language used for generating, constructing, building, assembling, or otherwise creating the webpage 1106. The HTML 1112 may be or include various instructions, code, etc., for a browser (e.g., the remote browser 1104, the local browser 1108, or other browser) to render, display or establish a DOM for the webpage 1106.

The server(s) 1102 may be communicably coupled via a network to a server which hosts the webpage 1106. The server(s) 1102 may communicate with the server hosting the webpage 1106 via a communications protocol such as HyperText Transfer Protocol (HTTP), HyperText Transfer Protocol Secure (HTTPS), etc. The server(s) 1102 may receive the HTML 1112 from the server hosting the webpage 1106 using the communications protocol. The remote browser 1104 executing on the server(s) 1102 may request, call for, access and/or retrieve the HTML 1112 for the webpage 1110. The remote browser 1104 may request, call for, access, and/or retrieve the HTML 1112 in response to a user calling or otherwise requesting the webpage 1110 (e.g., on the local browser 1108).

The remote browser 1104 may generate, create, maintain, or otherwise provide a document object model (DOM) 1114 of the HTML 1112 responsive to, or upon receiving the HTML 1112. The DOM 1114 may be an application programming interface (API) that provides, maintains and/or generates a tree structure for HTML, XHTML, and/or XML documents (e.g., the HTML 1112 for the webpage 1110). Each node in the tree structure may represent an object of the document (e.g., a portion of the document, a window of the document, an image or text within the document). The tree structure may represent the entire document, with individual nodes representing objects within the document. As the document is visually updated (e.g., by user interactions with the document), the DOM 1114 may correspondingly be updated. For instance, where a user selects a button or hyperlink, enlarges a window, changes a color, etc., such interactions may be reflected in the DOM 1114.

In some embodiments, the remote browser 1104 may include or correspond to an embedded browser or a secure browser. The embedded browser may be similar in some aspects to the embedded browser 410 described above with reference to at least FIGS. 4 and 8 for instance. The secure browser may be similar in some aspects to the secure browser 420 described above with reference to at least FIGS. 4, 5, 7, 8, and 10 for example. The embedded browser/secure browser may access network applications and/or webpages (e.g., a page provided by the web application). Where the remote browser 1104 is a secure browser, the secure browser may render the network applications and/or webpages to effectively subject those network applications and/or webpages to security mechanisms implemented by the secure browser. These network applications can be considered to be contained (e.g., securely) within a secure container. The use of such a secure browser can enable an enterprise to implement a content filtering policy in which, for example, employees are blocked from accessing certain web sites directly from their client devices. The secure browser can be used, for example, to enable client device users to access a corporate intranet without the need for a VPN.

The remote browser 1104 may be configured to receive the HTML 1112 for the webpage 1110. The remote browser 1104 may render the received HTML 1112 at the server(s) 1102. For instance, the remote browser 1104 may download the HTML 1112 from the server hosting the webpage 1110. The remote browser 1104 may download the HTML 1112 to, for instance, local memory at the server(s) 1102. The remote browser 1104 may parse the HTML 1112 to render the HTML 1112 at the server(s) 1102 (e.g., on the remote browser 1104).

The server(s) 1102 and/or remote browser 1104 may include a transcoding agent 1116. The transcoding agent 1116 may be configured to transcode the HTML 1112. "Transcode," as used herein, can mean re-writing, converting, and/or translating code from one coded representation to another coded representation. The transcoding agent 1116 may be configured to transcode the HTML 1112 from one coded representation to another coded representation. The transcoding agent 1116 may be configured to transcode the HTML 1112 to an encapsulated HTML 1118. "Encapsulated," as used herein, can mean having established a shell or preserved (or protected, shielded, limited exposure) version or representation of the HTML 1112.

The transcoding agent 1116 may generate, create, build, construct, or otherwise provide the encapsulated HTML 1118 using at least one web components API. For instance, the web components API may include or be part of web-components.js toolset or another HTML toolset. The transcoding agent 1116 may provide or implement the encapsulated HTML 1118 using Shadow DOM or custom element construct(s). The transcoding agent 1116 can provide or implement such constructs using web components APIs such as Shadow DOM or custom element. The Shadow DOM may be a revised version of the DOM 1114 that has unexposed elements configured to execute behind-the-scenes. The Shadow DOM may be a shell version of the DOM of the HTML 1114 in which certain elements or features are not exposed to manipulation or access. The custom element may be a feature developed, created, generated, produced, or otherwise provided to configure a specific function. The custom element may be used for encapsulating for instance a specific portion of the HTML 1112. The Shadow DOM or custom element construct may form a "shell" for the HTML 1112 for limited rendering. The Shadow DOM or custom element construct may shield the HTML 1112 from being exposed to, for instance, JAVASCRIPT manipulation. The Shadow DOM or custom element construct may preserve at least a portion of the HTML 1112 for the webpage 1110. In preserving the HTML for the webpage, the Shadow DOM or custom element construct may block certain interactions with the page that may modify underlying code for the page or for the client device (or client application). Hence, the Shadow DOM or custom element construct may generate or form a more basic or shielded or sanitized or safer version of the webpage 1110.

The transcoding agent 1116 may be configured to provide the encapsulated HTML 1118 so as to block JAVASCRIPT or extensions for the HTML 1112 from reacting to events (e.g., HTML events and/or DOM events). As described below, the local browser 1108 may maintain a DOM of the encapsulated HTML 1120. The encapsulated HTML 1118 from the transcoding agent 1116 may cause JAVASCRIPT or extensions in the DOM of the encapsulated HTML 1120 to be blocked from reacting to events, such as HTML events or DOM events (as described herein), on the local browser 1108. As one example, a user may select a button on what appears to the user as an advertisement video. In some instances, when the user selects a "play" button (and the corresponding event is detected), the video would play. However, in a DOM of the encapsulated HTML 1120, such an event can be blocked, thus preventing the DOM from reacting to the event (e.g., updating the page to play the video based on the detected event of the user selecting the "play" button).

The transcoding agent 1116 may be configured to provide the encapsulated HTML 1118 to cause a call to browser services to be intercepted in the DOM of the encapsulated HTML 1120. Browser services may be or include a centralized database, server, and/or computer having a map of local resources, such as notifications, history, XMLHttpRequest (XHR), cached data, history, etc., across various client devices within the network. The transcoding agent 1116 may provide and/or use custom elements to modify code corresponding to objects in the DOM (e.g., the DOM for the HTML 1114) for various aspects of the webpage 1110, into custom elements constructs. The custom elements constructs may re-route, intercept, ignore, disregard and/or reject any calls to browser services. The transcoding agent 1116 may modify the objects in the DOM by hooking (e.g., inserting code, revising the code, and/or re-coding) the object prototype corresponding to those objects. Such embodiments may preserve, or prevent/limit access to data in browser services by maintaining confidentiality, privacy, etc.

The server(s) 1102 may establish a connection with a client device 1106 for communicating the encapsulated HTML 1118 to the client device 1106. The server(s) 1102 and/or client device 1106 may include a networking agent. The networking agent may establish, create, generate, or otherwise form one or more connections between the server(s) 1102 and the client device 1106. The networking agent is sometimes referred to as an SD-WAN agent, mVPN agent, or microVPN agent. The networking agent can establish or facilitate establishment of a network connection between the server(s) 1102 and the client device 1106. The networking agent can perform handshaking for a requested connection between the server(s) 1102 and client device 1106, and can establish the requested connection. In some embodiments, the networking agent may establish a secure or encrypted connection, such as a virtual private network (VPN) or a secure socket layer (SSL) VPN between the server(s) 1102 and client device 1106. Such secure or encrypted connection may support remote delivery or provisioning of one or more network applications, web applications, and/or webpages. The VPN connections, sometimes referred to as microVPN or application-specific VPN, may be specific to particular network applications, particular devices, particular secured areas on the client device, and the like, for instance as discussed above in connection with FIG. 3. Such VPN connections can carry MICROSOFT Exchange traffic, MICROSOFT Active Directory traffic, HyperText Transfer Protocol (HTTP) traffic, HyperText Transfer Protocol Secure (HTTPS) traffic, as some examples.

In some embodiments, the networking agent may be designed or implemented to form an HTTP or web-based session between the server(s) 1102 and the client device 1106. The networking agent may establish a transmission control protocol (TCP) connection between the server 1102 (e.g., a port of the server 1102) and the client device 1106. The networking agent can exchange various commands, data, information, etc., between the server 1102 and client device 1106 within the HTTP session in accordance with TCP. In some embodiments, the networking agent may establish a secure HTTP (e.g., HTTPS) session in a manner similar to the secure connections described above. In some embodiments, the networking agent can form or establish the network connection between the server(s) 1102 and the client device 1106. In some embodiments, the networking agent may form or establish a secure connection (e.g., SSL VPN connection) between the server(s) 1102 and the client device 1106.

The server(s) 1102 may be designed or implemented to initiate a remote delivery session to deliver, for instance, the encapsulated HTML 1118 to the client device (or local browser). The server(s) 1102 may initiate the remote delivery session within or across the network connection established by the networking agent. In some embodiments, a remote session agent embodied on, included on, or located on the server(s) 1102 and/or client device 1106 may initiate the remote delivery session in response to a user calling a resource (e.g., the webpage 1110) at the client device 1106 (e.g., on the local browser 1108). In some embodiments, the remote session agent may initiate a provisioning or remote delivery session (e.g., which may be established using Citrix high definition user experience (HDX) or independent computing architecture (ICA) protocol, or remote desktop protocol (RDP)). The remote session agent may initiate the provisioning session in accordance with any type or form of protocols, such as RDP, Appliance Link Protocol (ALP), Remote Frame Buffer (RFB) Protocol, and ICA Protocol.

In some embodiments, the remote browser 1104 may be configured to deliver, communicate, provide, or otherwise send the encapsulated HTML 1118 to the local browser 1108 executing on the client device 1106. The remote browser 1104 may send the encapsulated HTML 1118 to the local browser 1108 via the remote delivery session. In some embodiments, the remote delivery session may be an HDX, ICA, RDP session, which may be established using the HDX, ICA, RDP protocols described above. As described below, the local browser 1108 may render the encapsulated HTML 1118, and may maintain a DOM for the encapsulated HTML 1120 (e.g., a local Shadow DOM) at the client device.

In some embodiments, the remote browser 1104 may be designed or implemented to render a portion of the HTML 1112 at the server 1102. The remote browser 1104 may render the portion of the HTML 1112 into an image including one or more pixels. The remote browser 1104 may render the portion of the HTML 1112 in response to various conditions. For example, the remote browser 1104 may render the portion of the HTML 1112 based on computing efficiency (e.g., where it would be more efficient for the portion of the HTML 1112 to be rendered at the server-side as opposed to the client side). The remote browser 1104 may render the portion of the HTML 1112 based on various security measures (e.g., according to policy controls). As one example, the remote browser 1104 may render a portion of the HTML 1112 for an image containing a hyperlink to prevent users from selecting the image and following the hyperlink. As another example, the remote browser 1104 may know or detect that the local browser cannot process or render a specific portion of the HTML 1112. The remote browser 1104 may for example receive an indication (e.g., from the local browser) indicating the capabilities of the local browser. For instance, the local browser may provide a list or description of available resources, plug-ins, etc. The remote browser 1104 may determine, based on the capabilities of the local browser, that the local browser is not capable of rendering (or that it is inefficient for the local browser to render) a specific portion of the HTML 1112. The remote browser may render such a portion of the HTML 1112 for delivery to the local browser, while the local browser may render the remaining portion(s) of the HTML 1112 delivered to the local browser.

The remote browser 1104 may be configured to render a portion of the HTML 1112 into an image (e.g., pixels), and the local browser 1108 may render the remaining portion of the HTML 1112 (e.g., delivered as encapsulated HTML). The remote browser 1104 may communicate, send, or otherwise provide the image via the remote delivery session to the local browser for displaying at the client device 1106. The remote browser 1104 may embed the image in the encapsulated HTML 1118, which is then sent (e.g., via the remote delivery session) to the client device 1106 for rendering at the local browser 1108. The remote browser 1104 may send the image separately from the encapsulated HTML 1118 (e.g., in a separate HTTP or HTTPS message).

The local browser 1108 may render the encapsulated HTML 1118 and display the webpage 1110 (e.g., based on the encapsulated HTML 1118 and including the image rendered at the remote browser 1104).

The client device 1106 may execute a local browser 1108. The client device 1106 may include one or more elements of any embodiment of the client device 402 described above in connection with at least FIGS. 4, 5, 7, and 8. In some embodiments, the local browser 1108 may execute within a client application. In some embodiments, the client application may include one or more elements of any embodiment of the client application 404 described above in connection with at least FIGS. 4 and 8. In some embodiments, the local browser 1110 may include or correspond to an embedded browser. The embedded browser can executed in, or be part of a client application as discussed above in connection with at least FIGS. 4 and 8. This client application with the embedded browser (CEB) can include any element or embodiment of a CEB as previously described above in connection with at least FIGS. 4 and 8. In some embodiments, the local browser 1110 may include or correspond to a third-party browser (e.g., INTERNET EXPLORER, FIREFOX, GOOGLE Chrome, SAFARI, etc.). The third-party browser may include or correspond to a standalone browser which can be downloaded, installed (e.g., natively), executed, hosted or otherwise run on the client device 1106.

The local browser 1108 may receive the encapsulated HTML 1118 via the remote delivery session. The local browser 1108 may download the encapsulated HTML 1118 from the server(s) 1102 (e.g., to local memory on the client device 1106). The local browser 1108 may generate a DOM of the encapsulated HTML 1120 (sometimes referred to as a local Shadow DOM). In this regard, the system 1100 may include two DOMS; a DOM of the HTML 1114 based on the HTML 1112 from the server hosting the webpage, and a DOM of the encapsulated HTML 1120 based on the encapsulated HTML 1118 from the transcoding agent 1116. The DOM of the encapsulated HTML 1120 may provide, include or maintain a tree structure for the encapsulated HTML 1118. Each node in the tree structure may represent an object of the document (e.g., a portion of the document, a window of the document, an image or text within the document, etc.) as represented in and/or by the encapsulated HTML 1118. The tree structure may represent the entire document, with individual nodes representing objects within the document.

The local browser 1108 may render the encapsulated HTML 1118 generated by the transcoding agent 1116. The local browser 1108 may parse the encapsulated HTML 1118 to render the encapsulated HTML 1118 to pixels (e.g., pixel or image form) for displaying on the client device 1106. The local browser 1108 may render a basic/sanitized/safe version of the webpage 1110 as reflected/represented in the encapsulated HTML 1118.

The local browser 1108 may be designed or implemented to detect, register, generate, and/or identify events. The events may be detected, registered, identified, etc., within the DOM of the encapsulated HTML 1120. The events may correspond to (e.g., may occur in or apply to) the DOM of the encapsulated HTML 1120. In some embodiments, the events may include or correspond to HTML events which register actions by the local browser 1108 and/or actions by a user. Various examples of HTML events include (but are not limited to) onchange (e.g., an HTML element has changed), onclick (e.g., the user clicks an HTML element), onmouseover (e.g., the user moves the mouse over an HTML element), onmouseout (e.g., the user moves the mouse away from an HTML element), onkeydown (the user pushes a keyboard key), and onload (the local browser 1108 has finished loading the page). Such HTML events may be registered, intercepted, detected, and/or identified by the local browser 1108.

In some embodiments, the events may include DOM object events. The local browser 1108 may include a Document Object Model (DOM) event listener which registers DOM events (such as mouse DOM events, keyboard DOM events, HTML frame/object/form DOM events, and/or other user interface DOM events). The DOM event listener may register these DOM events when they occur within a page rendered on the local browser 1108. In each embodiment, the local browser 1108 may generally detect, monitor, track for, or identify events corresponding to the encapsulated HTML 1120, which may be or include HTML events and/or DOM events.

The local browser 1108 may be configured to communicate the events (e.g., the DOM events and/or HTML events) to the transcoding agent 1116. The local browser 1108 may communicate the events (e.g., information about the events) as they are detected, identified, registered, etc. (e.g., in real-time or near real-time). The local browser 1108 may communicate (or mirror) the events to the remote browser via a remote delivery session. In some embodiments, the local browser 1108 may communicate the events across the same channel as the channel in which the encapsulated HTML 1118 is received. In some embodiments, the local browser 1108 may communicate the events across a different channel (e.g., within the same or different remote delivery session) as the channel in which the encapsulated HTML 1118 is received.

The transcoding agent 1116 may be configured to receive the events (e.g., the DOM events and/or HTML events) from the local browser 1108 (e.g., via the remote delivery session). The remote browser 1104 may be configured to cause the received events to execute on the DOM of the HTML 1114 (e.g., the DOM provided by the remote browser 1104). The remote browser 1104 may update, revise, modify, etc., the DOM of the HTML 1114 to reflect the received events. The revised DOM of the HTML 1114 may be used for revising the DOM of the encapsulated HTML 1120. In some embodiments, the transcoding agent 1116 may be configured to encapsulate the revised DOM of the HTML 1114 (e.g., in a manner similar to the transcoding agent 1116 encapsulating the DOM of the HTML 1114 described above). In this regard, the transcoding agent 1116 may re-encapsulate the DOM of the HTML 1114 to reflect the revised DOM based on the HTML/DOM events from the local browser 1108. In some embodiments, the transcoding agent 1116 may generate and send one or more updates to the previously-encapsulated HTML 1118 (e.g., prior to the event from the local browser 1108 being reflected in the DOM of the HTML 1114). In this regard, the transcoding agent 1116 may not necessarily fully encapsulate the DOM of the HTML 1115—the transcoding agent 1116 may modify (or provide instructions to the local browser 1108 for modifying or updating) the previously-conveyed encapsulated HTML 1118 in accordance with the event from the local browser 1108.

The local browser 1108 may render the encapsulated HTML 1118, including the updates thereto, based on the event(s) communicated to the transcoding agent 1116. Therefore, the local browser 1108 may communicate events to the transcoding agent 1116, and the local browser may render the encapsulated HTML 1118 including the updates based on the event(s) communicated to the transcoding agent 1116. In some embodiments, the local browser 1108 may construct a new DOM of the encapsulated HTML 1120 based on the updated encapsulated HTML 1118. In some embodiments, the local browser 1108 may revise the previous DOM of the encapsulated HTML 1120 in accordance with the updates or instructions from the transcoding agent 1116. The local browser 1108 may render the encapsulated HTML 1118 (including the updates thereto) to pixels for displaying at the client device 1106.

Referring to FIG. 12, depicted a flow diagram of one example embodiment of a method 1200 for encapsulating HyperText Markup Language (HTML). The functionalities of the method may be implemented using, or performed by, the components detailed herein in connection with FIGS. 1-11. In brief overview, a remote browser can provide a Document Object Model (DOM) of HTML (1205). A transcoding agent can encapsulate the HTML (1210). The transcoding agent can send the encapsulated HTML for rendering (1215). The transcoding agent can receive events (1220). The embedded browser can cause the events to execute (1225).

Referring now to operation (1205), and in some embodiments, a remote browser can provide a DOM. In some embodiments, the remote browser may be hosted on a server. The remote browser may provide the DOM of the HTML of a webpage rendered by the remote browser at the server. The server hosting the remote browser may be communicably coupled to a server which hosts the webpage. The server hosting the remote browser may communicate with the server hosting the webpage via a communications protocol such as HyperText Transfer Protocol (HTTP), HyperText Transfer Protocol Secure (HTTPS), etc. The server hosting the remote browser may receive the HTML for the webpage from the server hosting the webpage, via or using the communications protocol. The remote browser executing on the server may request, call for, retrieve, access, etc., the HTML for the webpage. The remote browser may request, call for, access, retrieve, etc., the HTML for the webpage in response to a user requesting the webpage (e.g., on a local browser executing on a client device operated by the user).

The remote browser may generate, create, maintain, or otherwise provide a document object model (DOM) of the HTML responsive to or upon receiving the HTML. The DOM may include, provide or correspond to an application programming interface (API) that provides, generates or maintains a tree structure for HTML, XHTML, and/or XML documents (e.g., the HTML for the webpage). Each node in the tree structure may represent an object of the document (e.g., a portion of the document, a window of the document, an image or text within the document, etc.). The tree structure may represent the entire document, with individual nodes representing objects within the document. As the document is visually updated (e.g., by user interactions with the document), the DOM may correspondingly be updated. For instance, where a user selects a button or hyperlink, enlarges a window, changes a color, etc., such interactions may be reflected in the DOM.

In some embodiments, the remote browser may be or include an embedded browser or secure browser. The embedded browser or secure browser may provide access to a web application. The webpage may be provided by the web application. The embedded browser/secure browser may access network applications and/or webpages (e.g., a page provided by the web application). Where the remote browser is a secure browser, the secure browser may render the network applications and/or webpages to effectively subject those network applications and/or webpages to security mechanisms implemented by the secure browser for instance. These network applications can be considered to be contained (e.g., securely) within a secure container. The use of such a secure browser can enable an enterprise to implement a content filtering policy in which, for example, employees are blocked from accessing certain web sites directly from their client devices. The secure browser can be used, for example, to enable client device users to access a corporate intranet without the need for a VPN.

In some embodiments, the remote browser may receive the HTML of the webpage, and may render the received HTML at the server. The remote browser may render the received HTML at the server hosting the remote browser. For instance, the remote browser may download the HTML from the server hosting the webpage. The remote browser may download the HTML to, for instance, local memory at the server hosting the remote browser. The remote browser may parse the HTML to render the HTML at the server (e.g., on the remote browser).

In some embodiments, the remote browser may render a portion of the HTML into an image corresponding to one or more pixels. The remote browser may render the portion of the HTML in response to various conditions. The remote browser may render the portion of the HTML based on computing efficiency (e.g., where it would be more efficient for the portion of the HTML to be rendered at the server-side as opposed to the client side). The remote browser may render the portion of the HTML based on various security measures (e.g., according to policy controls). As one example, the remote browser may render the portion of the HTML for an image containing a hyperlink to prevent users from selecting the image and following the hyperlink. As another example, the remote browser may render a portion of the HTML when the local browser is incapable of rendering the specific portion. For instance, the remote browser may receive an indication (e.g., from the local browser) indicating the capabilities of the local browser. The local browser may provide a list or description of available resources, plug-ins, etc. The remote browser may determine, based on the capabilities of the local browser, that the local browser is not capable of rendering a specific portion of the HTML. The remote browser may render such a portion of the HTML.

Referring now to operation (1210), and in some embodiments, a transcoding agent can encapsulate the HTML. The transcoding agent may execute in the remote browser. The transcoding agent executing in the remote browser may encapsulate the HTML (e.g., the HTML provided at operation (1205)). The transcoding agent may be configured to encapsulate the HTML by transcoding, rewriting, modifying, changing or reconfiguring the HTML (sometimes generally referred to as transcoding or encapsulating the HTML). The transcoding agent may be configured to transcode the HTML from one coded representation to another coded representation. The transcoding agent may be configured to transcode the HTML to an encapsulated HTML. The encapsulated HTML may provide or represent a shell, or a protected, or otherwise shielded version or representation of the HTML.

The transcoding agent may generate, create, build, construct, or otherwise provide the encapsulated HTML using at least one web components API, e.g., Shadow DOM and/or custom element. For instance, the web components API may include webcomponents.js toolset or another HTML toolset, that can provide various HTML constructs to replace certain HTML code. For example, the transcoding agent may provide the encapsulated HTML using one or more Shadow DOM and/or custom element constructs. The Shadow DOM or custom element constructs may form or implement a "shell" for the HTML. The Shadow DOM or custom element may shield or partially shield the HTML from being exposed to, for instance, JAVASCRIPT manipulation. The Shadow DOM or custom element may preserve at least a portion of the HTML of the webpage. In preserving the HTML for the webpage, the Shadow DOM or custom element may block certain interactions with the page that may modify underlying code of the page and/or the client device (or client application). Hence, the Shadow DOM or custom element may generate or form a more basic, shielded, sanitized, controllable, manageable and/or safer version of the webpage (e.g., as compared to the original webpage and/or the original webpage's corresponding HTML or DOM).

The transcoding agent may be configured to provide the encapsulated HTML so as to block JAVASCRIPT or extensions from the reacting to events (e.g., HTML events or DOM events). As described below, the local browser may maintain a DOM of the encapsulated HTML. The encapsulated HTML from the transcoding agent may cause JAVASCRIPT or extensions in the DOM of the encapsulated HTML to be blocked from reacting to events, such as HTML events or DOM events, from the local browser. As one example, a user may select a button on what appears to the user as an advertisement video. In some instances without encapsulation of the corresponding HTML, when the user selects a button (and the corresponding event is detected), the video would play. However, the same event (e.g., corresponding to the selection of the button) in a DOM of an encapsulated HTML can be blocked, thus preventing the DOM from reacting to the event (e.g., updating the page based on the detected event).

The transcoding agent may be configured to provide the encapsulated HTML to cause a call to browser services to be intercepted in the DOM of the encapsulated HTML. Browser services may be or include a centralized database, server, and/or computer having a map of local resources, such as notification, history, XMLHttpRequest (XHR), cached data, history, notifications, etc., across various client devices within the network. The transcoding agent may provide, use, generate, etc., custom elements to modify code corresponding to certain objects in the DOM (e.g., the DOM for the HTML) for various aspects of the webpage to re-route, intercept, ignore, disregard and/or reject any calls to browser services. For instance, these objects in a DOM may include embedded code which requests, calls, or otherwise retrieves data from browser services when the objects are selected (e.g., such as a hyperlink). Such objects may then report the data from browser services to a third-party, which may include confidential or otherwise private data. The transcoding agent may modify such objects in the DOM by hooking (e.g., inserting code, revising the code, and/or re-coding) the object prototype corresponding to those objects. Such embodiments may preserve data in browser services by maintaining confidentiality, privacy, etc.

Referring now to operation (1215), and in some embodiments, the transcoding agent can send the encapsulated HTML for rendering. The transcoding agent may send, convey or provision the encapsulated HTML to a client device or local browser via a remote delivery session for rendering. The local browser may execute on a client device. The local browser may maintain a DOM for the encapsulated HTML. In some embodiments, the local browser may execute within a client application. In some embodiments, the local browser may include or correspond to an embedded browser (e.g., embedded within the client application). In some embodiments, the local browser may include or correspond to a third-party browser (e.g., INTERNET EXPLORER, FIREFOX, GOOGLE Chrome, SAFARI). The third-party browser may be a standalone browser which can be downloaded, installed (e.g., natively), executed, or otherwise run on the client device.

The local browser may receive the encapsulated HTML via a remote delivery session. The server hosting the embedded browser and/or client device may establish a connection between the server for communicating/receiving the encapsulated HTML. The server and/or client device may include a networking agent. The networking agent may establish, create, generate, or otherwise form one or more connections between the server and the client device. The networking agent can establish or facilitate establishment of a network connection between the server and the client device. The networking agent can perform handshaking for a requested connection between the server and client device, and can establish the requested connection. In some embodiments, the networking agent may establish a secure or encrypted connection, such as a virtual private network (VPN) or a secure socket layer (SSL) VPN between the server and client device. Such VPN connections can carry MICROSOFT Exchange traffic, MICROSOFT Active Directory traffic, HyperText Transfer Protocol (HTTP) traffic, HyperText Transfer Protocol Secure (HTTPS) traffic, as some examples. In some embodiments, the networking agent may establish a secure HTTP (e.g., HTTPS) session in a manner similar to the secure connections described above. The server and/or client device may be designed or implemented to initiate a remote delivery session to deliver and/or receive, for instance, the encapsulated HTML. The server and/or client device may initiate the remote delivery session within or across the network connection established by the networking agent. In some embodiments, a remote session agent is embodied in, included in, or located on the server and/or client device. The remote session agent may initiate the remote delivery session in response to a user calling a resource (e.g., the webpage) at the client device (e.g., via the local browser).

The local browser may download or receive the encapsulated HTML from the server hosting the remote browser (e.g., to local memory on the client device). The local browser may generate a DOM of the encapsulated HTML (e.g., a local Shadow DOM). The DOM of the encapsulated HTML may provide or include a tree structure for the encapsulated HTML, similar to the DOM provided by the remote browser (e.g., at operation (1205)). Each node in the tree structure may represent an object of the document (e.g., a portion of the document, a window of the document, an image or text within the document) as represented in and/or by the encapsulated HTML. The tree structure may represent the entire document described or defined by the encapsulated HTML, with individual nodes representing objects within the document. As the document is visually updated (e.g., by user interactions with the document or webpage), the DOM may correspondingly be updated. For instance, where a user selects a button or hyperlink, enlarges a window, changes a color, etc., via a web interface of the document, such interactions may be reflected in the DOM.

The local browser may render the encapsulated HTML generated by the transcoding agent. The local browser may parse the encapsulated HTML to render the encapsulated HTML to pixels for displaying on the client device. The local browser may parse the DOM maintained by the local browser to generate pixels (or images in pixel form or other form) for displaying at the client device. The local browser may render a basic/sanitized/safe version of the webpage as reflected/represented in the encapsulated HTML.

In embodiments where the remote browser at the server renders a portion of the HTML into an image comprising one or more pixels, the transcoding agent may send the image via the remote delivery session to the local browser for display at the client device. Thus, the remote browser may be configured to render a portion of the HTML and the local browser may encapsulate another portion (e.g., the remaining portion) of the HTML. The remote browser may communicate, send, or otherwise provide the image via the remote delivery session to the local browser for displaying at the client device. The remote browser may embed the image in the encapsulated HTML (e.g., encapsulated portion of the HTML), which is then sent (e.g., via the remote delivery session) to the client device 1106 for rendering at the local browser. The remote browser may send the image separately from the encapsulated HTML (e.g., in a separate HTTP or HTTPS message). The local browser may receive the image from the transcoding agent from or via the remote delivery session. In some instances, the image may be received by the local browser from the remote browser within the encapsulated HTML. In some instances, the image may be received by the local browser from the remote browser separate from the encapsulated HTML. The local browser may render the encapsulated HTML and display the corresponding webpage (e.g., based on the encapsulated HTML and including the image rendered at the remote browser).

Referring now to operation (1220), and in some embodiments, the transcoding agent can receive events. In some embodiments, the transcoding agent may receive events corresponding to the DOM maintained by the local browser, from the local browser for instance. The local browser may detect, register, generate, and/or identify events. The events may be detected/registered/identified (e.g., by the local browser) within the DOM of the encapsulated HTML maintained by the local browser. The events may occur in, be directed to, or correspond to the DOM of the encapsulated HTML maintained by the local browser. In some embodiments, the events may include or correspond to HTML events triggered by or corresponding to actions by the local browser and/or actions by a user. Various examples of HTML events can include (but are not limited to) onchange (e.g., an HTML element has changed), onclick (e.g., the user clicks an HTML element), onmouseover (e.g., the user moves the mouse over an HTML element), onmouseout (e.g., the user moves the mouse away from an HTML element), onkeydown (the user pushes a keyboard key), and onload (the local browser 1108 has finished loading the page). Such HTML events may be registered, intercepted, detected, and/or identified by the local browser. In some embodiments, the events may be DOM object events. The local browser may include a Document Object Model (DOM) event listener which registers, detects and/or listens for DOM events (such as mouse DOM events, keyboard DOM events, HTML frame/object/form DOM events, and/or other user interface DOM events). The DOM event listener may register and/or detect these DOM events when they occur within the page rendered on the local browser. In these embodiments, the local browser 1108 may identify events corresponding to the encapsulated HTML 1120, which may be or include HTML events and/or DOM events.

The local browser may communicate the events (e.g., the DOM events and/or HTML events) to the transcoding agent. The local browser may communicate the events as they are detected, identified, registered, etc. (e.g., in real-time or near real-time). The local browser may communicate the events via the remote delivery session. The transcoding agent may receive the events (e.g., corresponding to the DOM maintained by the local browser) via the remote delivery session. In some embodiments, the local browser may communicate the events using the same channel of the remote delivery session as the channel in which the encapsulated HTML is received or communicated. In some embodiments, the local browser may communicate the events using a different channel (e.g., within the same or different remote delivery session) as the channel in which the encapsulated HTML is received.

Referring now to operation (1225), and in some embodiments, the remote browser can cause the events to execute. In some embodiments, the remote browser can cause the received events to execute on the DOM provided by the remote browser. The remote browser may be configured to cause the received events to execute on the DOM of the HTML (e.g., the DOM provided by the remote browser at operation (1205)). The remote browser may update, revise, modify, etc., the DOM of the HTML to reflect the received events. The revised DOM of the HTML may be used for revising or updating the DOM of the encapsulated HTML. In some embodiments, the transcoding agent may be configured to encapsulate the revised or updated DOM of the HTML (e.g., in a manner similar to the transcoding agent encapsulating the DOM of the HTML described above with reference to operation (1210)). The transcoding agent may re-encapsulate the DOM of the HTML to reflect the revised DOM, revised or updated based on the HTML/DOM events from the local browser (e.g., received at operation (1220)). In some embodiments, the transcoding agent may generate and send one or more updates to the previously-encapsulated HTML (e.g., the encapsulated HTML described with reference to operation (1210) and prior to the event being received at operation (1220)). In this regard, the transcoding agent may not necessarily encapsulate the entire revised DOM of the HTML for delivery to the local browser—the transcoding agent may provide modifications to (e.g., provide instructions or an incremental update to the local browser for modifying or updating) the previously-encapsulated HTML in accordance with the event from the local browser.

The local browser may render the encapsulated HTML, incorporating the updates thereto, based on the event(s) communicated to the transcoding agent. Therefore, the local browser may communicate events to the transcoding agent (e.g., at operation (1220)), and the local browser may render the encapsulated HTML including the updates based on the events communicated to the transcoding agent. In some embodiments, the local browser may construct a new DOM based on the updated encapsulated HTML. In some embodiments, the local browser may revise the previous DOM of the encapsulated HTML in accordance with the updates and/or instructions received from the transcoding agent. The local browser may render the encapsulated HTML (including the updates thereto) to pixels (or other suitable form) for displaying at the client device.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

The invention claimed is:

1. A method for encapsulating hypertext markup language (HTML), the method comprising:
generating, by a remote browser hosted on a server, a document object model (DOM) of HTML of a webpage rendered by the remote browser at the server;
causing, by a transcoding agent executing in the remote browser, a local DOM to block execution of an event on the local DOM, the event corresponding to a user action received by a local browser, by encapsulating the HTML, the local DOM comprising a DOM for the encapsulated HTML;
sending, by the transcoding agent, the encapsulated HTML via a remote delivery session to the local browser for rendering, wherein the local browser executes on a client device and maintains the local DOM for the encapsulated HTML;
receiving, by the transcoding agent from the local browser, events different from the blocked event, corresponding to the local DOM maintained by the local browser; and
causing, by the remote browser, the received events to execute on the DOM generated by the remote browser.

2. The method of claim 1, comprising encapsulating the HTML by transcoding the HTML using at least one web components application programming interface (API), wherein the at least one web components API comprises at least one of a shadow document object model or a custom element.

3. The method of claim 1, wherein the remote browser comprises an embedded browser or a secure browser that provides access to a web application, and the webpage is provided by the web application.

4. The method of claim 1, further comprising:
receiving, by the remote browser, the HTML of the webpage; and
rendering, by the remote browser at the server, the received HTML.

5. The method of claim 1, comprising receiving, by the transcoding agent via the remote delivery session, the events corresponding to the DOM maintained by the local browser.

6. The method of claim 1, further comprising rendering, by the remote browser at the server, a portion of the HTML into an image comprising one or more pixels.

7. The method of claim 6, further comprising sending, by the transcoding agent, the image via the remote delivery session to the local browser for display at the client device.

8. The method of claim 1, comprising encapsulating the HTML to cause code or extensions in the local DOM maintained for the encapsulated HTML to be blocked from reacting to the blocked event.

9. The method of claim 1, comprising encapsulating the HTML to cause a call to browser services to be intercepted in the local DOM maintained for the encapsulated HTML.

10. The method of claim 1, comprising causing the local browser to render at least a portion of the encapsulated HTML into pixels for display at the client device.

11. A system for encapsulating hypertext markup language (HTML), the system comprising:
a server comprising circuitry configured to execute a remote browser, the remote browser configured to generate a document object model (DOM) of HTML of a webpage rendered by the remote browser at the server, the remote browser configured to execute a transcoding agent configured to cause a local DOM to block execution of an event on the local DOM, the event corresponding to a user action received by a local browser, by encapsulating the HTML, the local DOM comprising a DOM for the encapsulated HTML;
send the encapsulated HTML via a remote delivery session to the local browser for rendering, wherein the local browser executes on a client device and maintains the local DOM for the encapsulated HTML; and
receive, from the local browser, events different from the blocked event, corresponding to the local DOM maintained by the local browser;
wherein the remote browser is further configured to cause the received events to execute on the DOM generated by the remote browser.

12. The system of claim 11, wherein the transcoding agent is configured to encapsulate the HTML by transcoding the HTML using at least one web components application programming interface (API), wherein the at least one web components API comprises at least one of a shadow document object model or a custom element.

13. The system of claim 11, wherein the remote browser comprises an embedded browser or a secure browser that provides access to a web application, and the webpage is provided by the web application.

14. The system of claim 11, wherein the remote browser is further configured to receive the HTML of the webpage, and to render the received HTML at the server.

15. The system of claim 11, wherein the transcoding agent is configured to receive, via the remote delivery session, the events corresponding to the DOM maintained by the local browser.

16. The system of claim 11, wherein the remote browser is further configured to render, at the server, a portion of the HTML into an image comprising one or more pixels.

17. The system of claim 16, wherein the transcoding agent is configured to send the image via the remote delivery session to the local browser for display at the client device.

18. The system of claim 11, wherein the transcoding agent is configured to encapsulate the HTML to cause code or extensions in the local DOM maintained for the encapsulated HTML to be blocked from reacting to the events.

19. The system of claim 11, wherein the transcoding agent is configured to encapsulate the HTML to cause a call to browser services to be intercepted in the local DOM maintained for the encapsulated HTML.

20. The system of claim 11, wherein the local browser renders at least a portion of the encapsulated HTML into pixels for display at the client device.

* * * * *